US012564982B2

(12) United States Patent
Valli

(10) Patent No.: US 12,564,982 B2
(45) Date of Patent: Mar. 3, 2026

(54) COMPACTING MACHINE AND PLANT FOR MANUFACTURING CERAMIC ARTICLES

(71) Applicant: SACMI COOPERATIVA MECCANICI IMOLA SOCIETA' COOPERATIVA, Imola (IT)

(72) Inventor: Andrea Valli, Imola (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 342 days.

(21) Appl. No.: 18/255,512

(22) PCT Filed: Dec. 1, 2021

(86) PCT No.: PCT/IB2021/061182

§ 371 (c)(1),
(2) Date: Jun. 1, 2023

(87) PCT Pub. No.: WO2022/118214

PCT Pub. Date: Jun. 9, 2022

(65) Prior Publication Data

US 2024/0001588 A1 Jan. 4, 2024

(30) Foreign Application Priority Data

Dec. 1, 2020 (IT) ........................ 102020000029294

(51) Int. Cl.
*B28B 1/00* (2006.01)
*B28B 3/12* (2006.01)
(Continued)

(52) U.S. Cl.
CPC .............. *B28B 1/008* (2013.01); *B28B 1/005* (2013.01); *B28B 3/123* (2013.01); *B28B 5/027* (2013.01); *B28B 13/022* (2013.01); *B28B 15/00* (2013.01)

(58) Field of Classification Search
CPC . B28B 13/022; B28B 13/023; B28B 13/0215; B28B 13/025; B28B 13/028;
(Continued)

(56) References Cited

U.S. PATENT DOCUMENTS 3,104,184 A * 9/1963 Wegenroth, Jr. ........ B28B 11/06 427/202
4,557,403 A * 12/1985 Stevenson .................. B01J 3/02 222/362
(Continued)

FOREIGN PATENT DOCUMENTS

CN 110418701 A 11/2019
CN 111068575 A 4/2020
(Continued)

OTHER PUBLICATIONS

Office Action received for Russian Patent Application No. 2023114436, mailed on Nov. 29, 2023, 07 pages.
(Continued)

*Primary Examiner* — Jeffrey M Wollschlager
*Assistant Examiner* — Edgaredmanuel Troche
(74) *Attorney, Agent, or Firm* — Workman Nydegger

(57) ABSTRACT

A plant for manufacturing ceramic articles comprising two feeding devices, each of which is configured to contain a powder material of a respective type and feed this powder material to a conveyor assembly. The plant further comprises an operating device, which is configured to allow the powder material to exit selectively from zones of the feeding devices arranged in succession crosswise to the movement direction, moving vertically and independently from one another a plurality of transfer moving parts, each provided with a transit channel through which the powder material moves to reach the conveyor assembly.

22 Claims, 16 Drawing Sheets

(51) Int. Cl.

| | |
|---|---|
| ***B28B 5/02*** | (2006.01) |
| ***B28B 13/02*** | (2006.01) |
| ***B28B 15/00*** | (2006.01) |

(58) Field of Classification Search

CPC ... B28B 13/0225; B28B 17/04; B28B 15/005; B28B 7/0046; B28B 7/0053; B28B 7/0069; B28B 7/0076; B28B 7/02; B28B 7/04; B28B 7/022; B29C 64/336; B29C 64/343; B29C 2043/3427; B29C 31/04; B29C 31/02; B22F 12/52; B22F 12/55; B22F 12/57; B05C 5/007; B05C 5/008; B05C 11/1036; B05C 11/1044; B65D 88/26; B65D 88/005; B65D 90/54; B65D 90/545; B65D 90/58; B65D 90/587; B65D 90/60; B65D 90/626; B65D 90/64; B65D 90/585; B65D 47/2093; B65D 47/248; B65D 83/48; B65D 83/52; B65D 83/44; B01F 35/754251; B01F 35/7545; B01F 35/7173; B01F 35/892; B01F 23/60; B65G 53/46; B65G 53/4608; B65G 53/4658; B65G 53/40; B65G 47/082; B65G 2201/04; F16K 3/029; E04H 7/22; E04H 7/24; F17C 13/04; F15B 2211/30525; F15B 2211/6355; F15B 13/0402; B21J 7/46; B44F 9/04

USPC ......... 425/240; 222/145.1, 252, 129, 132, 6; 366/134; 221/68, 91, 93, 99; 119/130; 137/625, 845; 239/66, 78, 93, 97–99, 239/266, 404, 536, 274, 302, 316, 336, 239/325, 353, 548, 443, 650, 668; 118/310; 92/8

See application file for complete search history.

(56) References Cited

U.S. PATENT DOCUMENTS

| | | | | | |
|---|---|---|---|---|---|
| 5,080,259 | A * | 1/1992 | Hadley | ..................... | B67B 7/28 141/330 |
| 5,823,398 | A * | 10/1998 | Russillo | ................. | A47G 19/34 222/361 |
| 6,228,422 | B1 | 5/2001 | White et al. | | |
| 2004/0247400 | A1 | 12/2004 | Cloue et al. | | |
| 2007/0194056 | A1 | 8/2007 | Webster et al. | | |
| 2020/0039108 | A1* | 2/2020 | Scardovi | ................... | B28B 3/12 |
| 2020/0124188 | A1* | 4/2020 | Kawakami | .............. | B01F 27/60 |

FOREIGN PATENT DOCUMENTS

| | | | | |
|---|---|---|---|---|
| CN | 111392254 A | 7/2020 | | |
| DE | 2400791 A1 | 7/1975 | | |
| GB | 1560831 | 6/1976 | | |
| GB | 1489271 A | 10/1977 | | |
| GB | 1560831 A * | 2/1980 | ........... | B65D 90/587 |
| RU | 2298516 C2 | 5/2007 | | |
| WO | 98/23424 | 6/1998 | | |
| WO | 00/11533 A1 | 3/2000 | | |

OTHER PUBLICATIONS

International Preliminary Report on Patentability received for PCT Patent Application No. PCT/IB2021/061182, mailed on Jun. 15, 2023, 12 pages.

International Search Report and Written Opinion received for PCT Patent Application No. PCT/IB2021/061182, mailed on Mar. 31, 2022, 16 pages.

International Search Report for application No. PCT/IB2021/061182 mailed on Mar. 31, 2022.

Office Action received for Chinese Patent Application No. 202180092289.2, mailed on Aug. 8, 2025, 28 pages (16 pages of English Translation and 12 pages of Original Document).

* cited by examiner

COMPACTING MACHINE AND PLANT FOR MANUFACTURING CERAMIC ARTICLES

CROSS-REFERENCE TO RELATED APPLICATIONS

This application is a 371 US Nationalization of International Application No. PCT/IB2021/061182, filed Dec. 1, 2021, which claims priority from Italian patent application no. 102020000029294 filed on Dec. 1, 2020, the entire disclosures of which are incorporated herein by reference.

TECHNICAL FIELD

The present invention relates to a compacting machine and a plant for manufacturing ceramic articles.

BACKGROUND ART

In the field of production of ceramic articles (in particular, slabs; more in particular, tiles) the use of machines for compacting semi-dry powders (ceramic powders; moisture content of approximately 5-6%) is known. These machines comprise ceramic powder feeding devices of different types.

Often these machines are used for manufacturing products that imitate natural stones, such as marble and/or granite.

These products have internal veins distributed randomly within the thickness of the products.

Alternatively or additionally, it can be advantageous to use powders of different types to obtain articles with particular structural and/or physical features.

In some cases, mixtures of powders of different colours are placed with a random distribution inside cavities of steel moulds and then compressed so as to obtain, for example, slabs of compacted powder.

The production of slabs with a random distribution of powders of different colours has been proposed also using continuous compacting machines that comprise a conveyor assembly for transporting (in a substantially continuous manner) the powder material along a given path through a work station, in the area of which a compacting device is arranged, which is adapted, through the cooperation of pressure rollers, to compact the powder material so as to obtain a layer of compacted powder.

An example of a continuous machine for compacting ceramic powder is described in the international patent application with publication number WO2005/068146 by the same Applicant as the present application.

The manufacture (for example, by means of digital printing) of a graphic decoration over the layer of compacted ceramic powder is also known, so as to make the finished article visually more similar to a natural product.

The international patent application WO2018/163124 by the same Applicant describes a plant for manufacturing ceramic articles comprising two feeding devices, each of which is adapted to contain a powder material of a respective type and feed this powder material to a conveyor assembly; furthermore, the plant comprises an operating device, which is adapted to allow the powder material to exit selectively zones of the feeding devices arranged in succession crosswise to the movement direction, and a control unit that controls the operating device as a function of a desired reference distribution and of how far the conveyor assembly moves the powder material. In particular, the operating device comprises a plurality of operating units, each of which is arranged in the area of a respective zone to regulate the passage of the material through this zone.

However, plants available to date for manufacturing ceramic articles have some drawbacks. These include the following. The devices that allow the selective feeding of different types of powder material are relatively complex, cumbersome (therefore difficult to miniaturise—this also leads to difficulties in increasing the distribution resolution) and costly. Furthermore, they do not always allow precise and repeatable distribution of the powders to be obtained.

The object of the present invention is to provide a compacting machine and a plant that allow the drawbacks of the known art to be at least partially overcome, and which are, at the same time, simple and inexpensive to manufacture.

SUMMARY

According to the present invention, a compacting machine and a plant for manufacturing ceramic articles are provided according to what is claimed in the appended independent claims below and, preferably, in any one of the claims directly or indirectly dependent on the independent claims.

BRIEF DESCRIPTION OF THE FIGURES

The invention is hereinafter described with reference to the accompanying drawings, which depict some non-limiting embodiments thereof, wherein.

DETAILED DESCRIPTION

Figure 1:
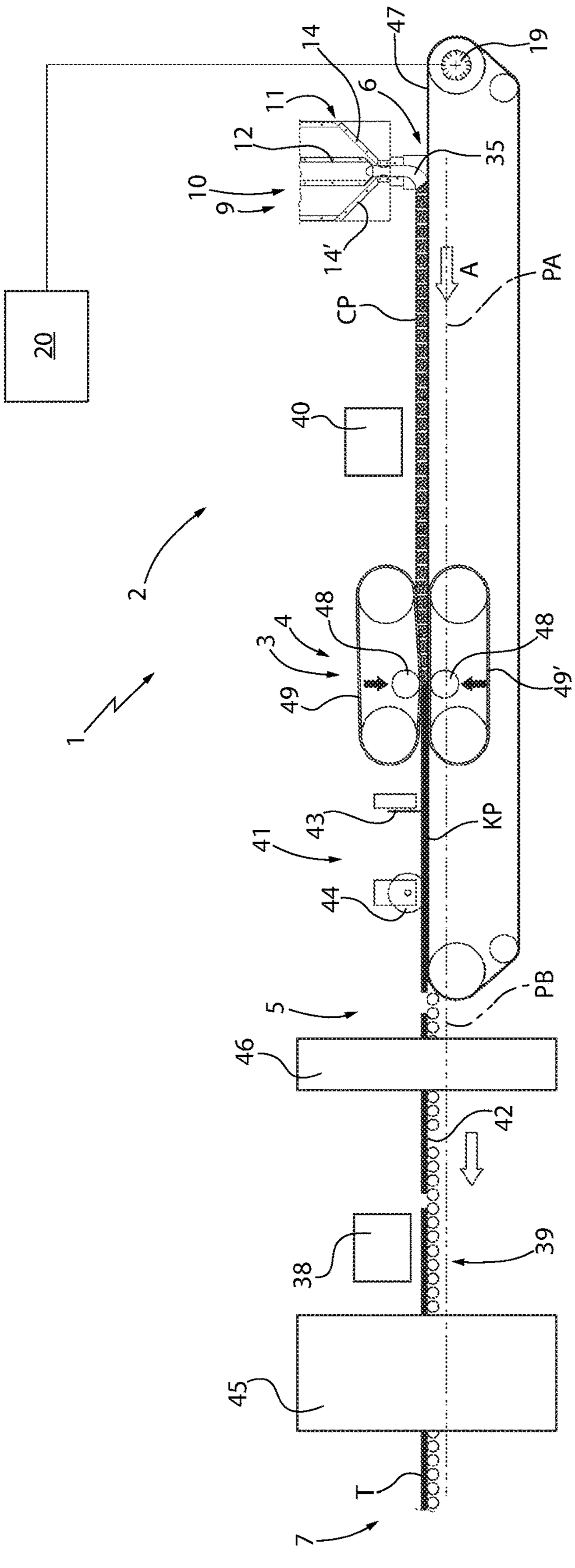
FIG. 1 is schematic and side view of a plant in accordance with the present invention.
Figure 2:
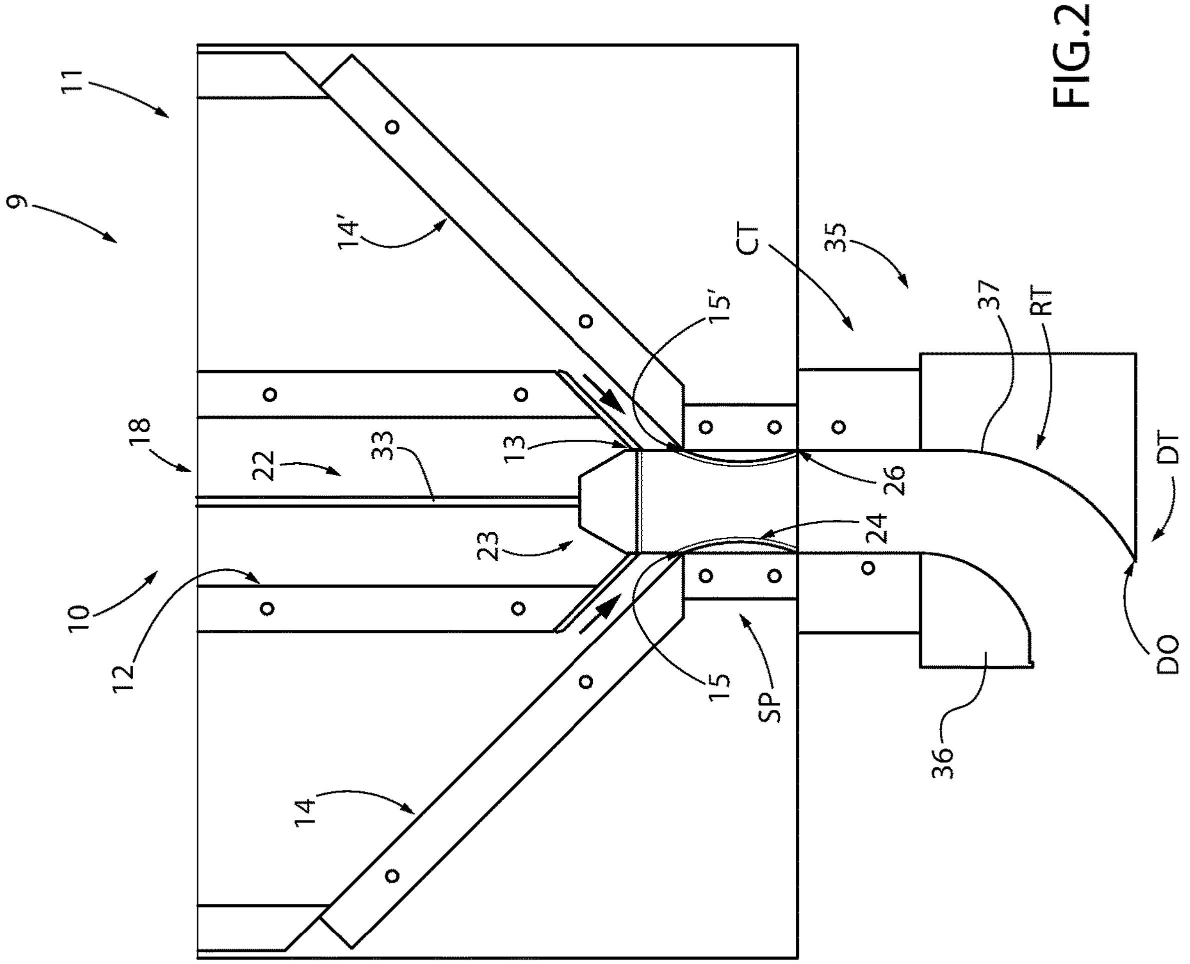
FIGS. 2 and 3 are side views of an internal part of the plant of FIG. 1 in two different operating configurations.
Figure 3:
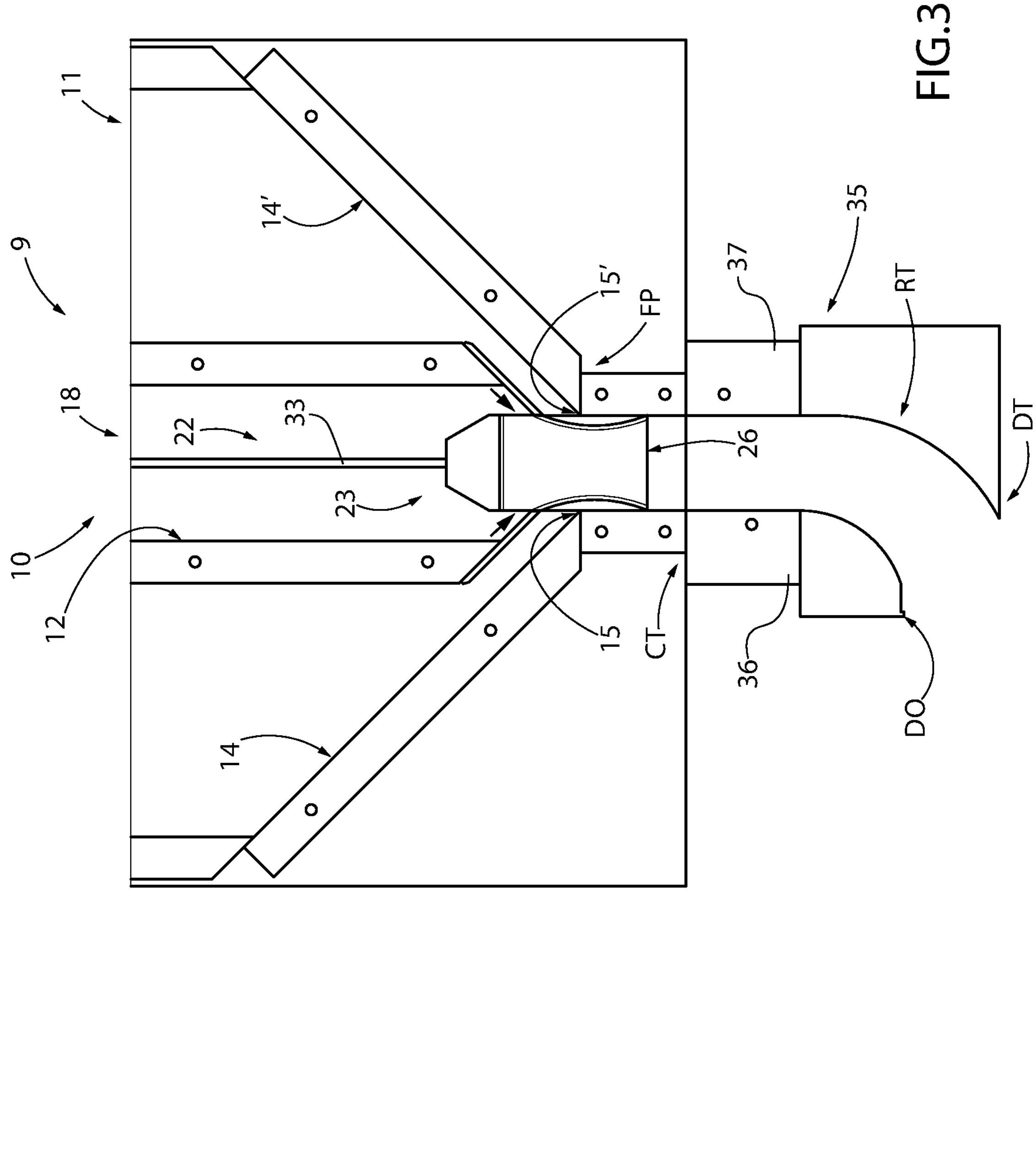
Figure 4:
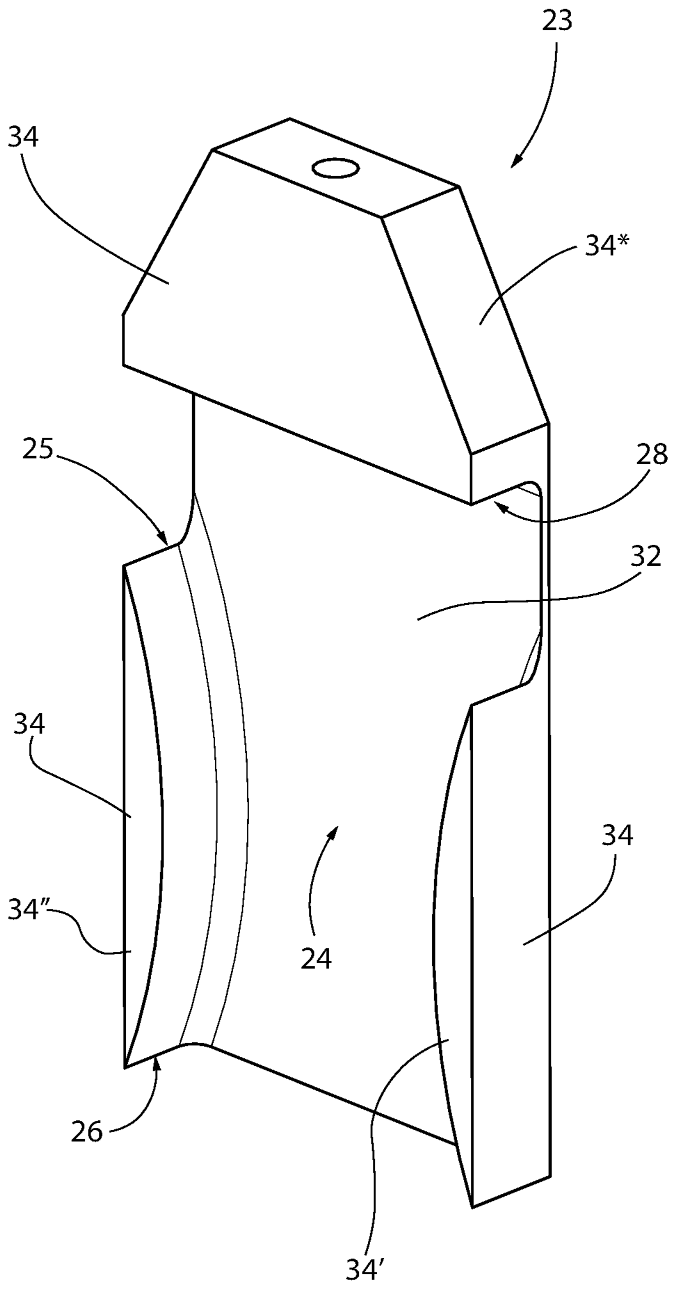
FIG. 4 is a perspective view of a component of FIGS. 2 and 3.

In FIG. 1, the reference number 1 indicates as a whole a plant for manufacturing ceramic articles T.

The plant 1 is provided with a compacting machine 2 for compacting powder material CP, comprising ceramic powder (in particular, the powder material CP is ceramic powder; more in particular, the ceramic powder has a moisture content of approximately 5-6%).

In particular, the ceramic articles T produced are slabs (more precisely, tiles).

The machine 2 comprises a compacting device 3, which is arranged in the area of a work station 4 and is adapted to (configured to) compact the powder material CP so as to obtain a layer of compacted powder KP; and a conveyor assembly 5 (configured) to transport (in a substantially continuous way) the powder material CP along a portion PA of a given path from an input station 6 to the work station 4 in a movement direction A (in particular, substantially horizontal) and the layer of compacted powder KP from the work station 4 along a portion PB of the given path to an output station 7 (in particular, in the direction A). In particular, the given path consists of the portions PA and PB.

According to non-limiting embodiments, the compacting device 3 is configured to exert a pressure of at least approximately 350 $kg/cm^2$ (in particular, at least approximately 380 $kg/cm^2$; in particular, up to approximately 450 $kg/cm^2$; more in particular, up to approximately 420 $kg/cm^2$) on the powder material CP.

With particular reference to FIGS. 2, 3, 5-9, 12 and 13, the machine 2 is also provided with a feeding assembly 9, which comprises a feeding device 10 and a feeding device 11 which are arranged above the conveyor assembly 5. The feeding device comprises a respective containing chamber 12 having at least one relative output mouth 13, whose longitudinal extension is transverse (in particular, perpendicular) to the movement direction A (this longitudinal extension is, in particular, substantially horizontal). The second feeding device 11 comprises at least one respective containing chamber 14 having a relative output mouth 15, whose longitudinal extension is transverse (in particular, perpendicular) to the movement direction A (this longitudinal extension is, in particular, substantially horizontal). In particular, the longitudinal extensions of the output mouths 13 and 15 are substantially parallel to each other.

More precisely, the containing chamber 12 is adapted to (configured to) contain a (ceramic) powder material CA of a first type and the containing chamber 14 is adapted to (configured to) contain a (ceramic) powder material CB of a second type.

According to some non-limiting embodiments, the powder materials CA and CB (are ceramic and) have different colours from each other. In this way it is possible to create chromatic effects in the thickness of the ceramic articles T. These chromatic effects are, for example, visible in the edges of the ceramic articles. Alternatively or additionally, the powder materials CA and CB are adapted to (configured to) produce different physical features in the ceramic articles T.

In particular, the powder material CP consists of one or both the powder materials CA and CB. More precisely, the powder material CP comprises (consists of) the powder materials CA and CB.

According to some embodiments (such as those depicted), the feeding device 10 comprises a (single) containing chamber 12 while the feeding device 11 comprises two containing chambers 14 and 14' (arranged on opposite sides of the containing chamber 12). Furthermore, each containing chamber 14 and 14' has a respective output mouth 15 and 15' (in particular, substantially facing one another).

The output mouth 13 has respective passage zones 16 (see, in particular, FIGS. 5 and 6) arranged in succession along the longitudinal extension of the output mouth 13. The output mouth 15 (and the output mouth 15') have respective passage zones 17 arranged in succession along the longitudinal extension of the output mouth 15. The feeding assembly 9 further comprises an operating device 18 (see in particular, FIG. 2), which is adapted to (configured to) allow the powder material to exit selectively through one or more of the passage zones 16 and 17. In particular, each passage zone 16 is arranged beside (more precisely, above; in particular, associated with) a respective passage zone 17.

Figure 15:
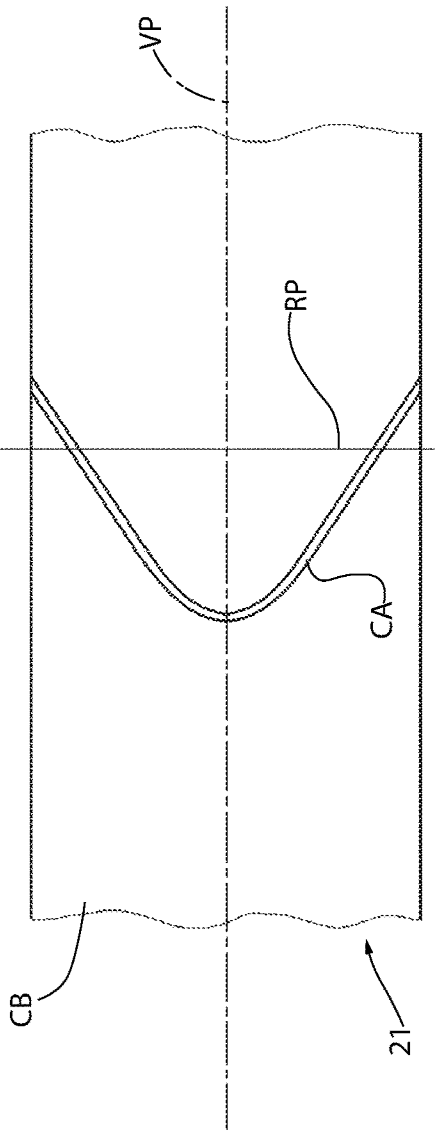
FIG. 15 is a virtual representation of a part of the control process of the plant of FIG. 1.

Advantageously but not necessarily, the machine 1 further comprises (FIG. 1) a control unit 20, which is adapted to (configured to) store (has stored) a reference distribution 21 (FIG. 15) of the powder material CA and CB of the first and of the second types (to be obtained) in the powder material CP transported by the conveyor assembly 5 and to control the operating device 18 as a function of the reference distribution 21. More in particular, the control unit 20 is adapted to (configured to) control the operating device 18 so as to reproduce (on the conveyor assembly 5) the reference distribution 21.

According to some non-limiting embodiments, the machine 1 further comprises a detection device 19 (for example an encoder) to detect the extent to which, in length, the conveyor assembly 5 transports the powder material CP along the given path (in the movement direction A), in particular, along the portion PA. In these cases, in particular, the control unit 20 is adapted to (configured to) control the operating device 18 as a function of the data detected by the detection device 19 and of the reference distribution 21. More in particular, the control unit 20 is adapted to (configured to) control the operating device 18 as a function of the data detected by the detection device 19 so as to reproduce (on the conveyor assembly 5) the reference distribution 21.

Figure 5:
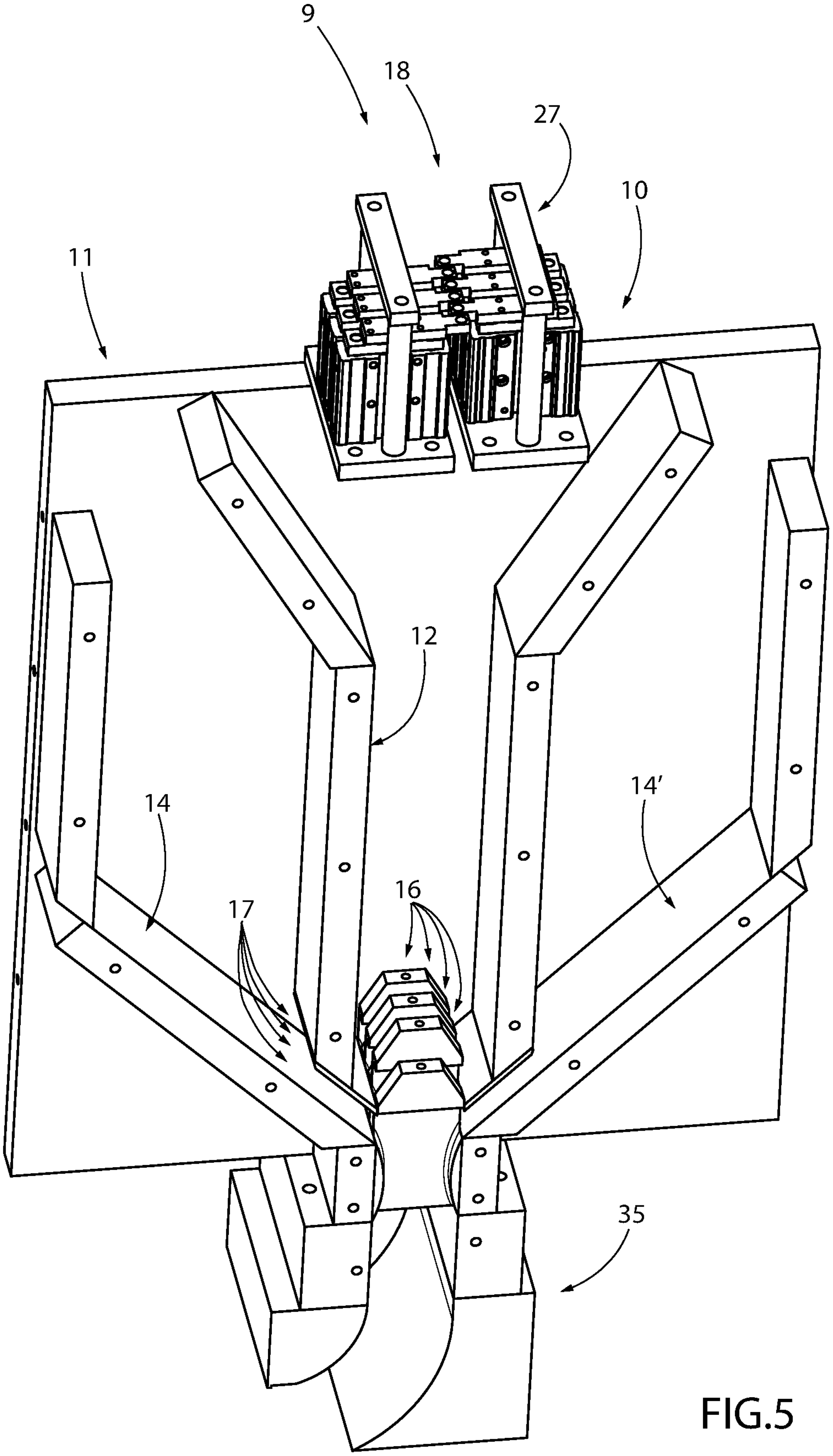
FIG. 5 is a perspective view including the part of FIGS. 2 and 3.
Figure 6:
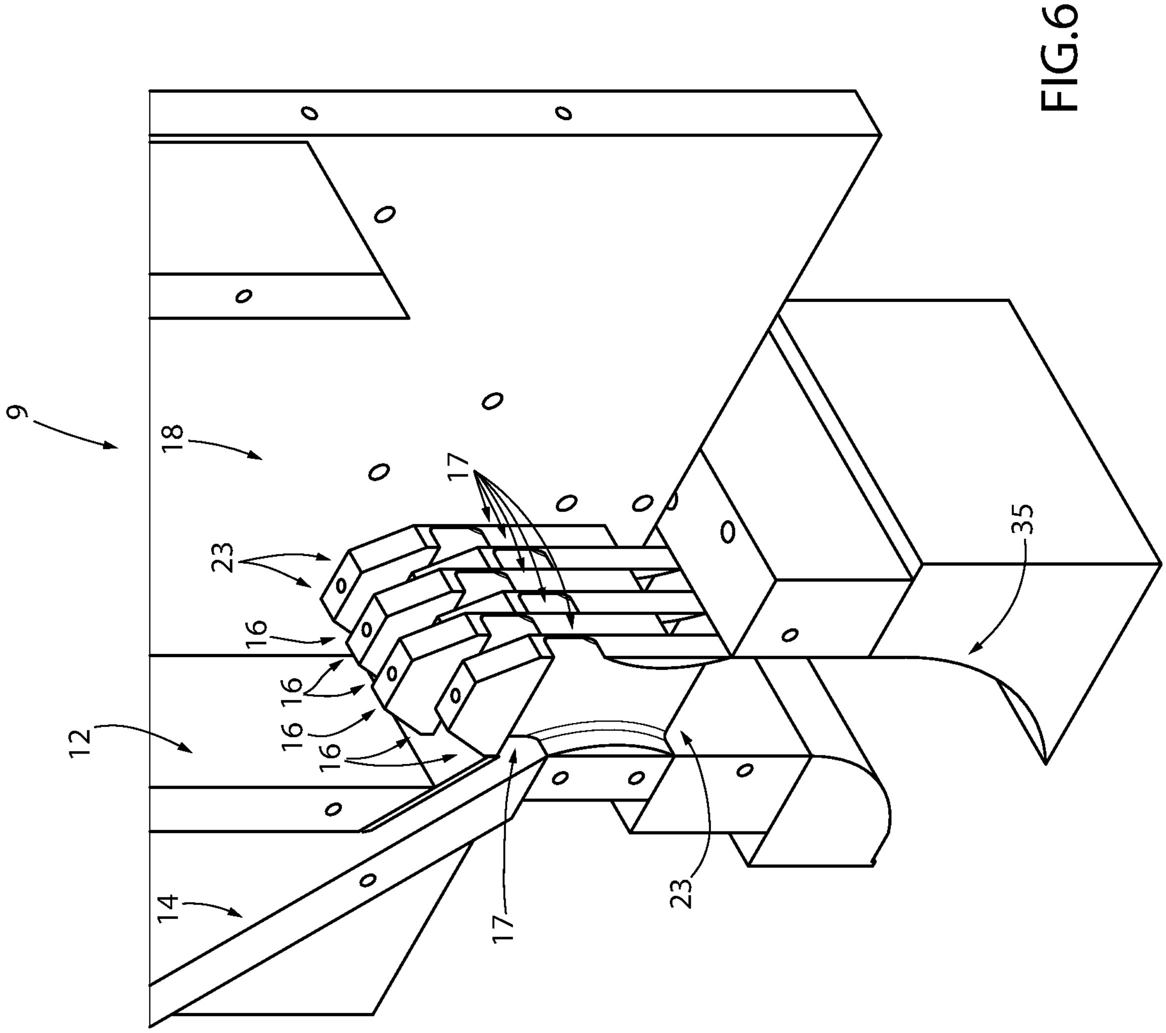
FIG. 6 is a perspective view, with some components removed for clarity, of a portion of FIGS. 2 and 3.

According to some non-limiting embodiments (see, in particular, FIGS. 5 and 6), the operating device 18 comprises a plurality of operating unit 22 (only four of which are depicted in FIGS. 5 and 6), each of which is arranged in the area of a respective passage zone 16 and 17 and is adapted to (configured to) regulate the passage of the powder material through the respective passage zones 16 and 17. In particular, the operating units 22 are arranged in succession (in a crosswise direction—in particular, substantially perpendicular—to the movement direction A) along the longitudinal extension of the output mouth 13 and of the output mouth 15.

Advantageously but not necessarily, the control unit 20 is configured to control each operating unit 22 independently with respect to the other operating units 22 (as a function of the data detected by the detection device 19 and of the reference distribution 21).

In particular, in use, the control unit 20 (virtually) moves the reference distribution 21 along a virtual path VP (FIG. 15) through a virtual reference front RP as a function of (according to) the data detected by the detection device 19. The virtual reference front VP has a plurality of positions, each of which corresponding to a passage area 16 and to a passage area 17 associated with each other; the control unit operates the feeding assembly 9 (in particular, the feeding devices 10 and 11; more in particular, the operating device 18; even more in particular, the operating units 22) so as to allow the powder material to exit at a specific instant through the passage zones 16 and/or 17 as a function of the type of powder material provided at the specific instant, in the reference distribution 21, in the positions of the virtual reference front RP corresponding to said passage zones 16 and/or 17.

Advantageously but not necessarily (see, in particular, FIGS. 2, 3, 5-9 and 12-14), each operating unit 22 comprises a respective transfer moving part 23, which has a transit channel 24 (i.e., a recessed corridor or a duct) provided with at least one input 25 and at least one output 26 arranged under the input 25, and a respective actuator 27 (FIG. 5) to move the transfer moving part 23 to a first position FP, in which the transit channel 24 is connected to the containing chamber 12 (FIGS. 3, 9 and 13) so that the powder material CA of the first type moves from the containing chamber 12 to the transit channel 24 (in particular, through the channel 24 itself; more in particular, through the input 25; even more in particular, through the output mouth 13), and at least to a second position SP, which is arranged under the first position FP and in which the transit channel 24 is connected to the containing chamber 14 (FIGS. 2, 8 and 12) so that the powder material CB of the second type moves from the containing chamber 14 (and/or 14') to the transit channel 24 (in particular, through the channel 24 itself; more in particular, through the input 25; even more in particular, through the output mouth 15).

In other words, each actuator 27 is configured to move (in particular, substantially vertically) the transfer moving part 23 (at least) between the first position FP and the second position SP and vice versa.

In yet other words, each actuator 27 is configured to move (in particular, substantially vertically) the moving part 23 (at least) from the first position FP to the second position SP and vice versa.

It should be noted that, as the channel 24 is part of the moving part 23, it (the channel 24) moves together with the moving part 23.

In particular, the second position SP is arranged lower than (in particular, under) the first position FP. In other words, the first position FP is arranged in a position higher than (above) the second position SP.

It should be noted that the structure and the operation of the operating units 22 described above are particularly simple and inexpensive. For example, with a single actuator 27 it is possible to selectively and promptly feed two or (as will be explained in more detail below) more types of powder material to the conveyor assembly 5. Furthermore, the need to use gaskets (and/or sealing systems) is greatly reduced.

In particular, the second position SP is arranged lower than (in particular, under) the first position FP. In other words, the first position FP is arranged in a position higher than (above) the second position SP.

In this way it is possible to obtain more precise feed of the powder: each type of powder passes through the same output 26 (therefore in the same position).

Advantageously but not necessarily, each actuator 27 is configured to move the respective moving part 23 between the first position FP and the second position SP in a direction (in particular, substantially vertical) crosswise (in particular, substantially perpendicular) to the direction A.

According to some non-limiting embodiments, the transit channel 24 is configured (structured) so that the powder material CA and/or CB flows (more in particular, due to the force of gravity) through the transit channel 24 itself (from the input 25 and/or from a further input 28—described in more detail below—to the output 26).

Additionally or alternatively, the transit channel 24 is configured (structured) so that the powder material CA and/or CB exits (more in particular, due to the force of gravity) from the channel 24 itself through the output 26.

According to some non-limiting embodiments (see, in particular, FIGS. 2 and 3), (each operating unit 22 is configured so that, when the transfer moving part 23 is) in the first position FP, the input 25 faces the output mouth 13.

More precisely but not necessarily, (each operating unit 22 is configured so that, when the transfer moving part 23 is) in the first position FP, the moving part 23 is (at least) partially arranged inside the containing chamber 12 (in particular, the input 25 is inside the containing chamber 12).

In particular, each operating unit 22 is configured so that, when the transfer moving part 23 is in the first position FP, the moving part 23 (at least partially; more in particular, completely) closes the output mouth 13.

Additionally or alternatively, (when the transfer moving part is) in the second position SP, the input 25 faces the output mouth 15.

With particular reference to FIGS. 4, 10, 12 and 14, advantageously but not necessarily, each transit channel 24 is provided with at least one further input 28; (each operating unit 22 is configured so that, when the respective transfer moving part 23 is) in the first position FP, the input 28 is connected to the containing chamber 12 so that the powder material CA of the first type moves from the containing chamber 12 to the transit channel 24 (through the input 28).

In particular, (when the transfer moving part 23 is) in the second position SP, the input 28 is arranged so that the powder material CB of the second type moves (from the feeding device 11) to the channel 24 (also) through the input 28. More in particular, (when the transfer moving part 23 is) in the second position SP, the input 28 is arranged so that it is connected to the further containing chamber 14' (of the feeding device 11 and, more in particular, containing the powder material CB of the second type) so that the powder material CB of the second type moves from the containing chamber 14' to the transit channel 24 (through the input 28). More in particular, the input 28 faces the further output mouth 15' of the containing chamber 14'.

For example, the containing chamber 12 is arranged between the containing chambers 14 and 14'.

According to some non-limiting embodiments, the input 25 and the further input 28 are at least partially arranged on opposite sides of the respective transfer moving part 23. In other words, the input 25 and the further input 28 (at least partially) face opposite sides with respect to the respective moving part 23.

Advantageously but not necessarily, each output 26 is facing downward.

Advantageously but not necessarily, as better depicted in FIGS. 5 and 6, the transfer moving parts 23 are arranged in succession crosswise to the movement direction A (in particular, along the output mouth 13 and the second output mouth 15; more in particular, also along the output mouth 15'; more in particular, along a further output mouth 29 of a further containing chamber 30—described in more detail below) so that each moving part 23 is in contact (in particular, in a sealed manner—i.e., so as to prevent the passage of particles of the powder material CP) with the adjacent transfer moving part/s 23.

In this way it is possible to avoid the use of costly and complex (above all to assemble) bulkheads arranged between adjacent operating units 22 (the use of which is instead recommended in the machine described in the patent application WO2018/163124). Moreover, there is even less need to use gaskets (and/or sealing systems), which are relatively costly, difficult to mount and prone to wear.

In particular, each actuator 27 is configured to move the respective transfer moving part 23 so that the respective transfer moving part 23 slides in contact with the adjacent transfer moving part/s 23.

According to some non-limiting embodiments, each transfer moving part 23 comprises a respective base wall 32, which partially delimits the transit channel 24. In particular, each base wall 32 is transverse to a direction of longitudinal extension of the output mouth 13 and, in particular, of the output mouth 15. More in particular, each base wall 32 is substantially parallel to the movement direction A.

Advantageously but not necessarily, each transfer moving part 23 has no wall opposite the base wall 32. In other words, the channel 24 is a cavity (open at the top) in the body of the moving part 23, which therefore has at least one raised portion 34 with respect to the channel 24 (see, in particular, FIGS. 4 and 10—in the case in hand the raised portions 34 are three).

The manufacture of moving parts 23 with this shape is particularly simple. Furthermore, in this way it is more difficult for obstructions (e.g., caused by lumps of powder material) to form along the channel 24.

According to some non-limiting embodiments, at least one of the channels 24 (in particular, each channel 24 except one) is delimited by the opposite part of the respective base wall 32 (in other words, of the base wall 32 of the respective moving part 23) by the base wall 32 of the adjacent transfer moving part 23 (arranged on the opposite side of the respective base wall 32).

In particular (FIGS. 5 and 6), each actuator 27 is configured to move the respective transfer moving part 23 so that the respective transfer moving part 23 slides in contact with the adjacent transfer moving part/s 23. In other words, each moving part 23 is moved so that its base wall 32 slides in contact with the portion/s 34 of the adjacent moving part 23 and/or so that its portion/s 34 slides/slide in contact with the base wall 32 of the adjacent moving part.

With particular reference to FIGS. 2, 3, 7-9, 12 and 13 (in which the description below is exemplified), advantageously but not necessarily, each operating unit 22 comprises a respective operating rod 33, which is integral to the respective moving part 23 and is connected to the respective actuator 27 (FIG. 5) so as to transfer motion from the actuator 27 to the moving part 23. According to some non-limiting embodiments, the operating rod 33 extends from the moving part 23 (in particular, from an upper end of the moving part 23) upwards (in particular, vertically) through the containing chamber 12. For example, the actuator 27 comprises a pneumatic operating member or an electric motor (in particular, linear). Advantageously but not necessarily, the actuator 27 is arranged above the containing chamber 12.

According to some non-limiting embodiments, not depicted, each actuator 27 is configured to move the respective transfer moving part 23 to an intermediate position (in particular, so as to maintain it in this position), which is between the first position FP and the second position SP and in which the respective transit channel 24 is connected to the containing chamber 12 so that the powder material CA moves from the containing chamber 12 to the transit channel 24 (through the output mouth 13) and is connected to the containing chamber 14 so that the powder material CB moves from the containing chamber 14 to the transit channel 24 (in particular, through the output mouth 15).

Figure 7:
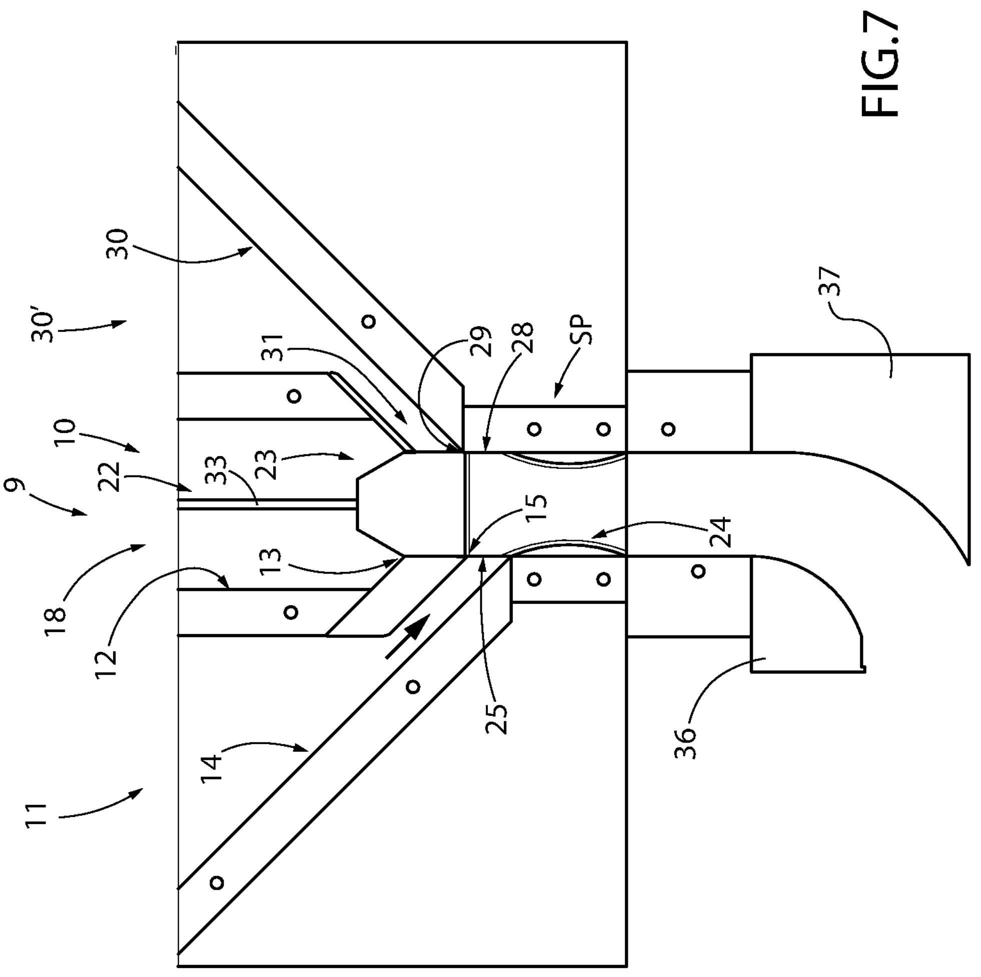
FIGS. 7, 8 and 9 are side views of a different embodiment of the part of FIGS. 2 and 3 in different operating configurations.
Figure 8:
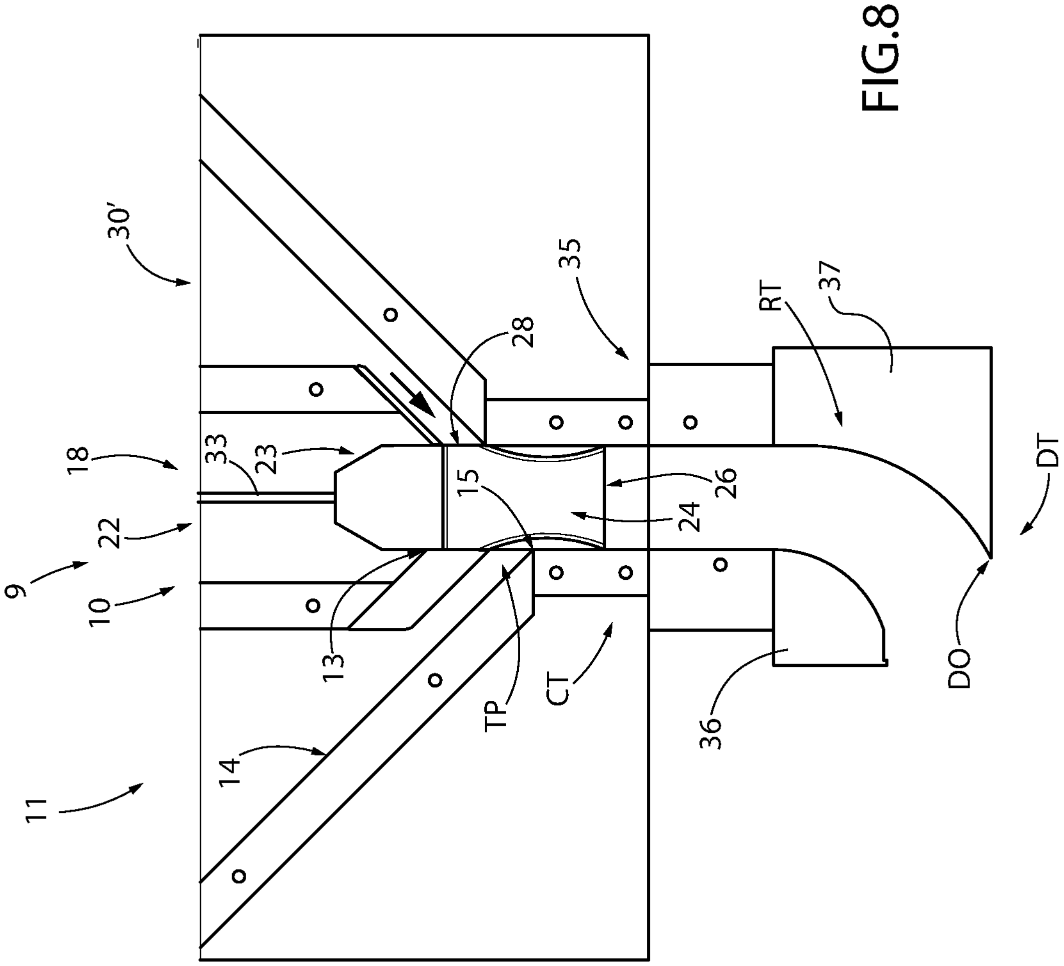
Figure 9:
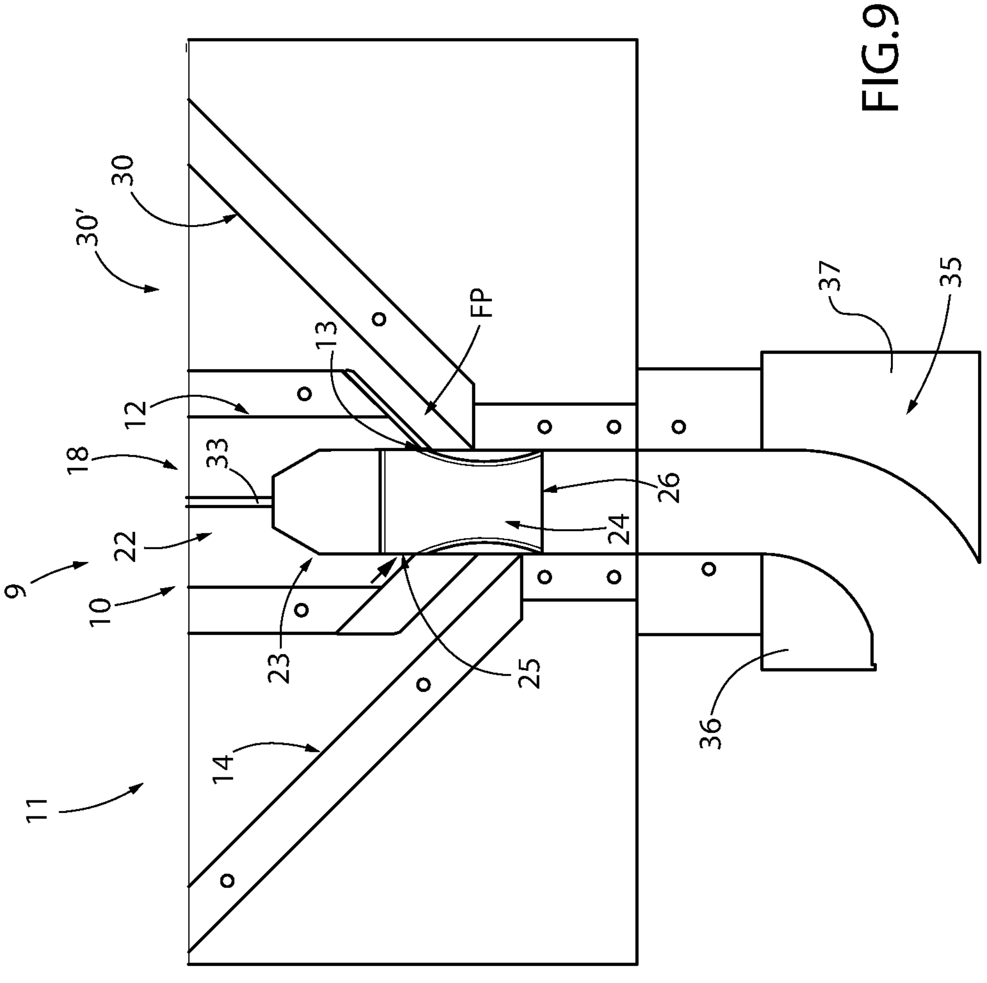
Figure 10:
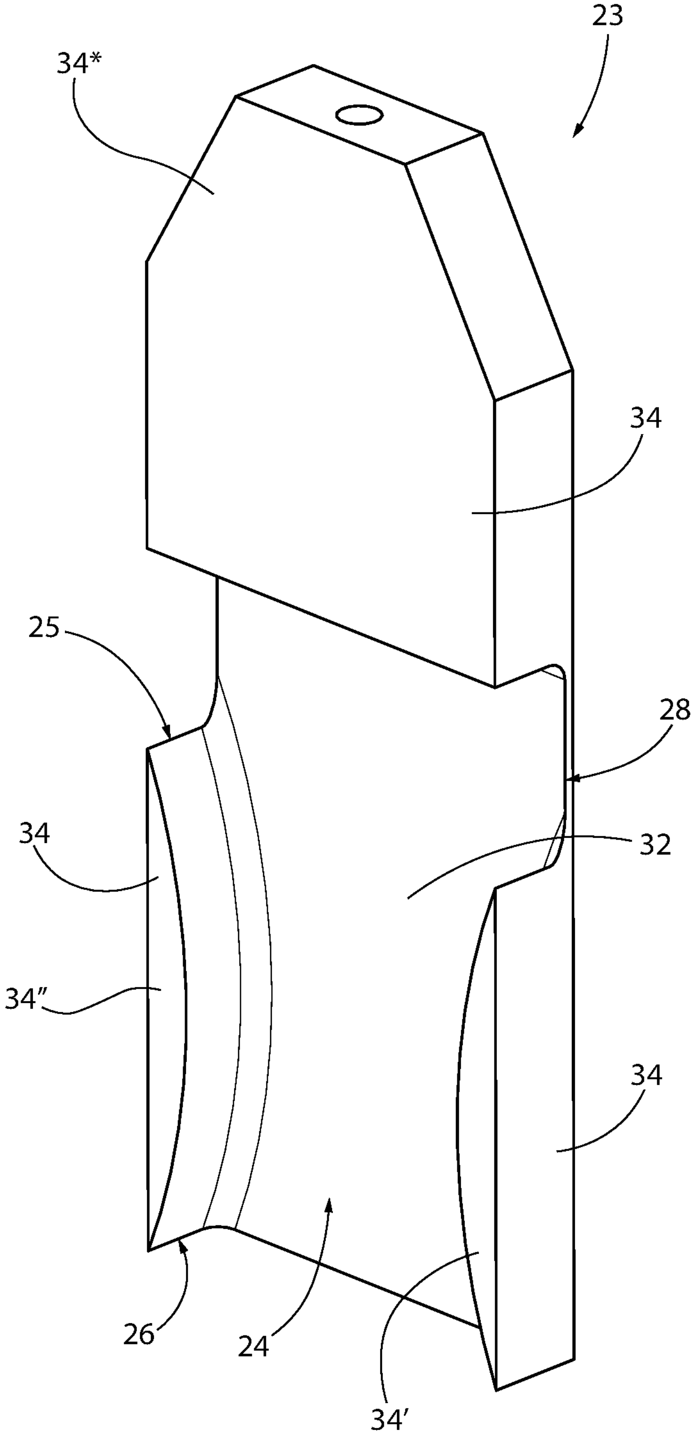
FIG. 10 is a perspective view of a component of FIGS. 7, 8 and 9.

With particular reference to FIGS. 7 to 9, advantageously but not necessarily, the feeding assembly 9 comprises at least another feeding device 30', which is arranged above the conveyor assembly 5 (in particular, in the area of the input station 6) and comprises a respective containing chamber 30 configured to contain a powder material of a third type (ceramic material not specifically depicted) and having a relative output mouth 29, whose longitudinal extension is transverse (in particular, perpendicular) to the movement direction A (this longitudinal extension is, in particular, substantially horizontal). In particular, the longitudinal extension of the output mouth 29 is substantially parallel to the longitudinal extension of the outputs 13 and 15.

According to some embodiments, the powder material of the third type has a different colour from that of the powder materials CA and CB. In this way, it is possible to create chromatic effects in the thickness of the ceramic articles T. These chromatic effects are, for example, visible in the edges of the ceramic articles T. Alternatively or additionally, the powder material of the third type is adapted to (configured to) produce different physical features in the ceramic articles T with respect to the powder materials CA and CB.

In particular, the powder material CP consists of one of the powder materials of the three types or (advantageously) of the powder materials of all three types. More precisely, the powder material CP comprises (consists of) the powder material of the third type and the powder materials CA and CB.

The output mouth 29 has respective passage zones 31 arranged in succession along the longitudinal extension of the third output mouth 29.

In particular, each passage zone 31 is arranged beside (more precisely, between; in particular, associated with) a respective passage zone 17 and a respective passage zone 16.

In particular, the operating device 18 is configured to allow (in particular, and/or prevent) the output of the powder material of the third type through the passage zones 31; each operating unit 22 is arranged in the area of a respective passage zone 31, is configured to regulate the passage of the powder material of the third type through the respective passage zone 31. More in particular, each actuator 27 is configured to move the transfer moving part 23 at least to a third position TP (FIG. 8), in which the transit channel 24 is connected to the containing chamber 30 so that the powder material of the third type moves from the containing chamber 30 to the transit channel 24 (in particular, through the output mouth 29).

More precisely but not necessarily, (each operating unit 22 is configured so that, when the transfer moving part 23 is) in the third position TP, the input 28 faces the output mouth 29.

In particular, the third position TP is between the first position FP and the second position SP.

According to some non-limiting embodiments, the third position TP is arranged lower than (in particular, under) the first position FP. In other words, the first position FP is arranged in a position higher than (above) the third position TP.

Additionally or alternatively, the second position SP is arranged lower than (in particular, under) the third position TP. In other words, the third position TP is arranged in a position higher than (above) the second position SP.

Advantageously but not necessarily, each actuator 27 is configured to move the respective moving part 23 between the first position FP and the third position TP and between the third position TP and the second position SP in a direction (in particular, substantially vertical) transverse (in particular, substantially perpendicular) to the direction A.

Advantageously but not necessarily, (each operating unit 22 is configured so that, when the transfer moving part 23 is) in the third position TP, the powder material CA and/or CB coming from the feeding devices 10 and/or 11 (in particular, from the containing chambers 12 and/or 14) does not enter the transit channel 24.

Additionally or alternatively (similarly), (each operating unit 22 is configured so that, when the transfer moving part 23 is) in the second position SP, the powder material CA of the first type and/or the powder material of the third type coming from the feeding devices 10 and/or 30' (in particular, from the containing chambers 12 and/or 30) does not enter the transit channel 24.

Additionally or alternatively (analogously), (each operating unit 22 is configured so that, when the transfer moving part 23 is) in the first position SP, the powder material CB of the second type and/or the powder material of the third type coming from the feeding devices 11 and/or 30' (in particular, from the containing chambers 14 and/or 30) does not enter the transit channel 24.

According to some non-limiting embodiments (see, in particular, FIGS. 16-19), the feeding assembly 9 comprises at least a further (in the case in hand, fourth) feeding device 10' (structurally and functionally similar to the feeding device 30'), which is arranged over the conveyor assembly 5 (and under the feeding device 30') and comprises a respective containing chamber 12' (similar to the containing chamber 30) configured to contain a powder material of a fourth type (ceramic material not specifically depicted) and having a relative (fourth) output mouth 50 (similar to the output mouth 29), whose longitudinal extension is transverse (in particular, perpendicular) to the movement direction A (this longitudinal extension is, in particular, substantially horizontal).

In particular, the longitudinal extension of the output mouth is substantially parallel to the longitudinal extension of the output mouths 13, 15 and 29.

According to some embodiments, the powder material of the fourth type has a different colour from that of the powder materials CA and CB and of the third type. In this way, it is possible to create particular chromatic effects in the thickness of the ceramic articles T. These chromatic effects are, for example, visible in the edges of the ceramic articles T. Alternatively or additionally, the powder material of the fourth type is adapted to (configured to) produce different physical features in the ceramic articles T with respect to the powder materials CA and CB and of the third type.

In particular, the powder material CP consists of one of the powder materials of the four types or (advantageously) of the powder materials of all four types. More precisely, the powder material CP comprises (consists of) the powder material of the fourth type, of the third type and the powder materials CA and CB.

The fourth output mouth 50 has respective fourth passage zones 51 (similar to the passage zones 31) arranged in succession along the longitudinal extension of the fourth output mouth 50 itself.

In particular, each fourth passage zone 51 is arranged beside (more precisely, between; in particular, associated with) a respective passage zone 31, a passage zone 17 and a respective passage zone 16.

In particular, the operating device 18 is configured to allow (in particular, and/or prevent) the powder material of the fourth type to exit/from exiting through the fourth passage zones 51; each operating unit 22 is arranged in the area of a fourth respective passage zone 51, is configured to regulate the passage of the powder material of the fourth type through the respective fourth passage zone 51. More in particular, each actuator 27 is configured to move the transfer moving part 23 at least to a fourth position FFP, in which the transit channel 24 is connected to the containing chamber 12' of the fourth feeding device so that the powder material of the fourth type moves to the transit channel 24 (in particular, through the fourth output mouth).

More precisely but not necessarily, (each operating unit 22 is configured so that, when the transfer moving part 23 is) in the fourth position FFP, the input 28 faces the fourth output mouth 50.

Advantageously but not necessarily, (each operating unit 22 is configured so that, when the transfer moving part 23 is) in the fourth position FFP, the powder material of the third type and/or CA and/or CB coming from the feeding devices 30' and/or and/or 11 (in particular, from the containing chambers 30 and/or 12 and/or 14) does not enter the transit channel 24.

According to some non-limiting embodiments, the fourth position FFP is arranged lower than (in particular, under) the first position FP. In other words, the first position FP is arranged in a position higher than (above) the fourth position FFP.

Additionally or alternatively, the fourth position FFP is arranged lower than (in particular, under) the third position TP. In other words, the third position TP is arranged in a position higher than (above) the fourth position FFP.

Additionally or alternatively, the fourth position FFP is arranged lower than (in particular, under) the second position SP. In other words, the second position SP is arranged in a position higher than (above) the fourth position FFP.

Advantageously but not necessarily, each actuator 27 is configured to move the respective moving part 23 between the first position FP and the fourth position FFP, between the third position TP and the fourth position FFP and between the second position SP and the fourth position FFP in a direction (in particular, substantially vertical) transverse (in particular, substantially perpendicular) to the direction A.

Advantageously but not necessarily, the feeding assembly 9 comprises a transfer chamber 35, which is shaped so as to contain the powder material CP received from the feeding device 10 (more precisely from the containing chamber 12) and from the feeding device 11 (more precisely, from the containing chamber 14) (in particular, also from the feeding device 30'; more precisely, from the containing chamber 30), through the channels 24 and to transfer the powder material CP to the conveyor assembly 5 in the area of the input station 6.

The transfer chamber 35 is arranged between the feeding device 10 (more precisely, the containing chamber 12) and the feeding device 11 (more precisely, the containing chamber 14) (in particular, also the feeding device 30'; more precisely, the containing chamber 30) on one side and the conveyor assembly 5 on the other; in particular, the transfer moving parts 23 are mounted so as to slide along at least part of the transfer chamber 35.

The transfer chamber 35 has a first wall 36 (in particular, transverse to the movement direction A) and at least a second wall 37 (in particular, transverse to the movement direction A, in particular, parallel to the wall 36), which faces the wall 36 and is arranged upstream of the wall 36 with respect to the movement direction A.

The transfer chamber 35 has a charging segment CT (in particular, substantially vertical) which is crosswise (in particular, substantially perpendicular) to the movement direction A and arranged under the containing chamber 12 and the containing chamber 14 (in particular, also the containing chamber 30), a discharging segment DT provided with a discharging opening DO at least partially oriented in the movement direction A so as to transfer the powder material CP onto the conveyor assembly 5 and a joining segment RT, which is curved and arranged between the charging segment CT and the discharging segment DT.

Figure 11:
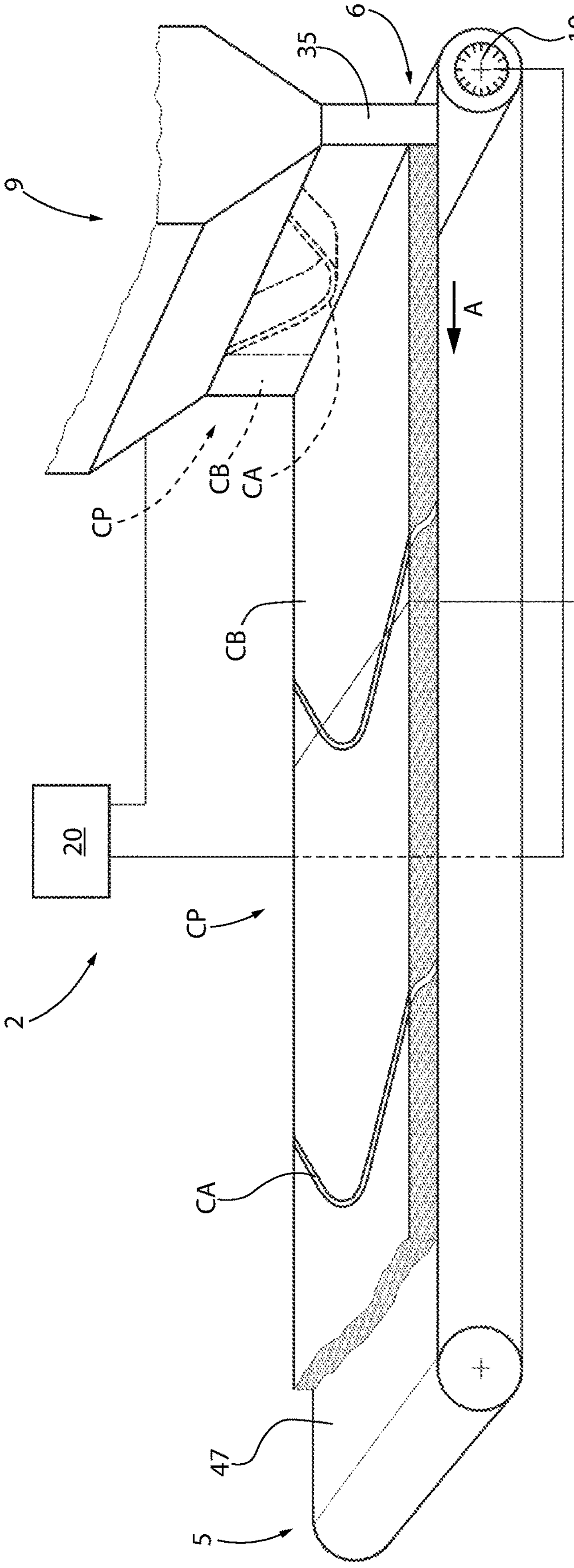
FIG. 11 is a perspective and schematic view of a part of the plant of FIG. 1.

It has been experimentally observed that this particular structure causes a deformation of the relative distribution of the powder materials CA and CB while these powder materials move from the feeding assembly 9 to the conveyor assembly 5. With reference, for example, to FIG. 11, it can be noted how the powder material CA slopes, forming a sort of smudge.

Figure 12:
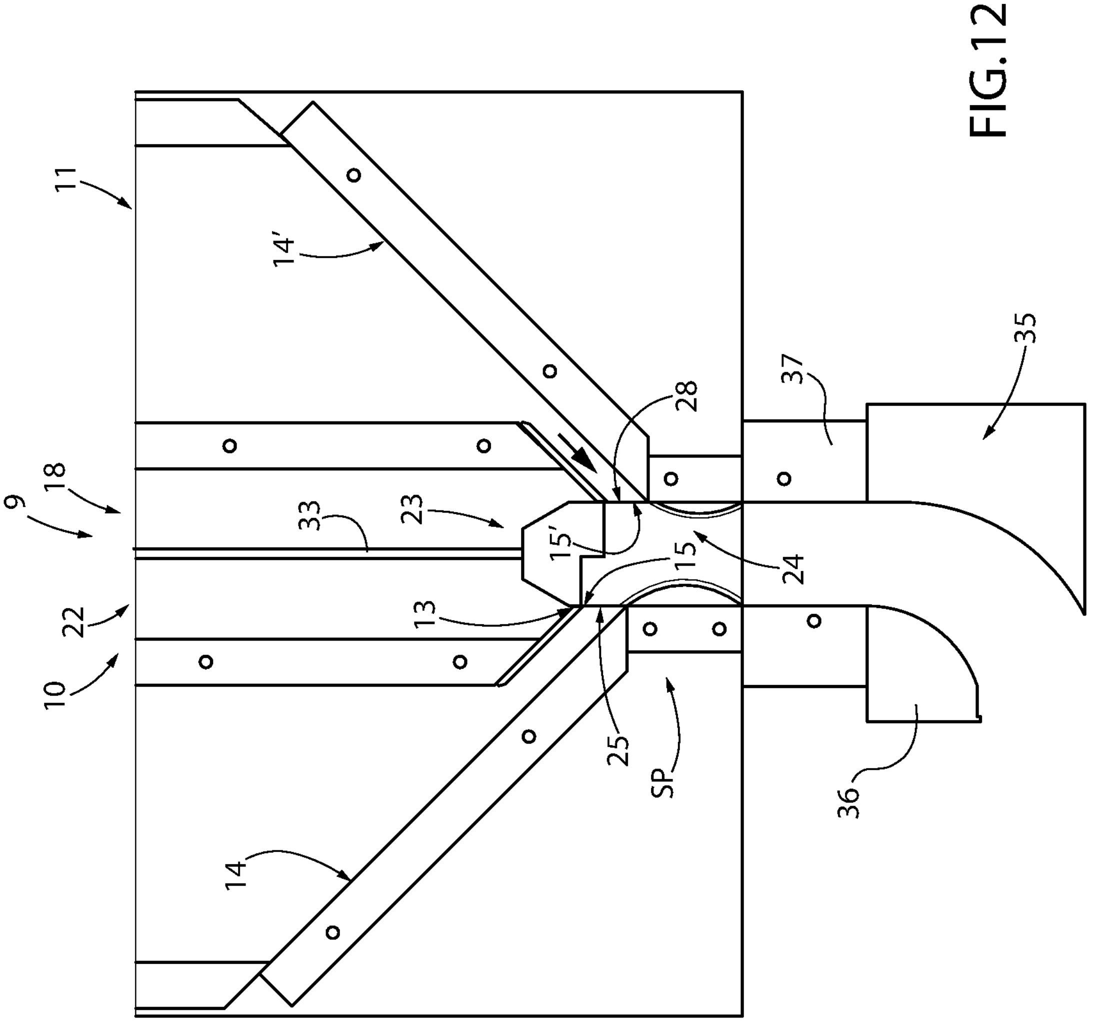
FIGS. 12 and 13 are side views of a different embodiment of the part of FIGS. 2 and 3 in different operating configurations.
Figure 13:
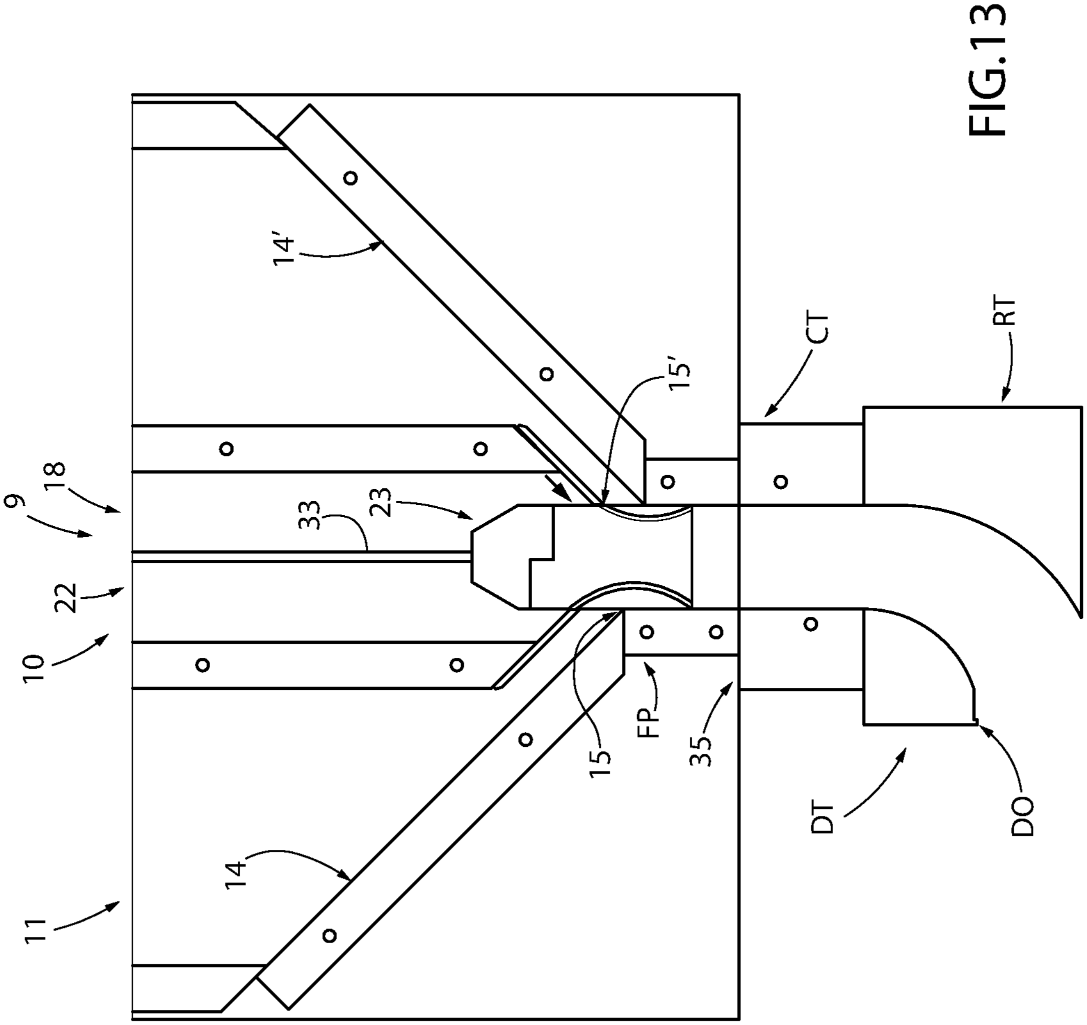
Figure 14:
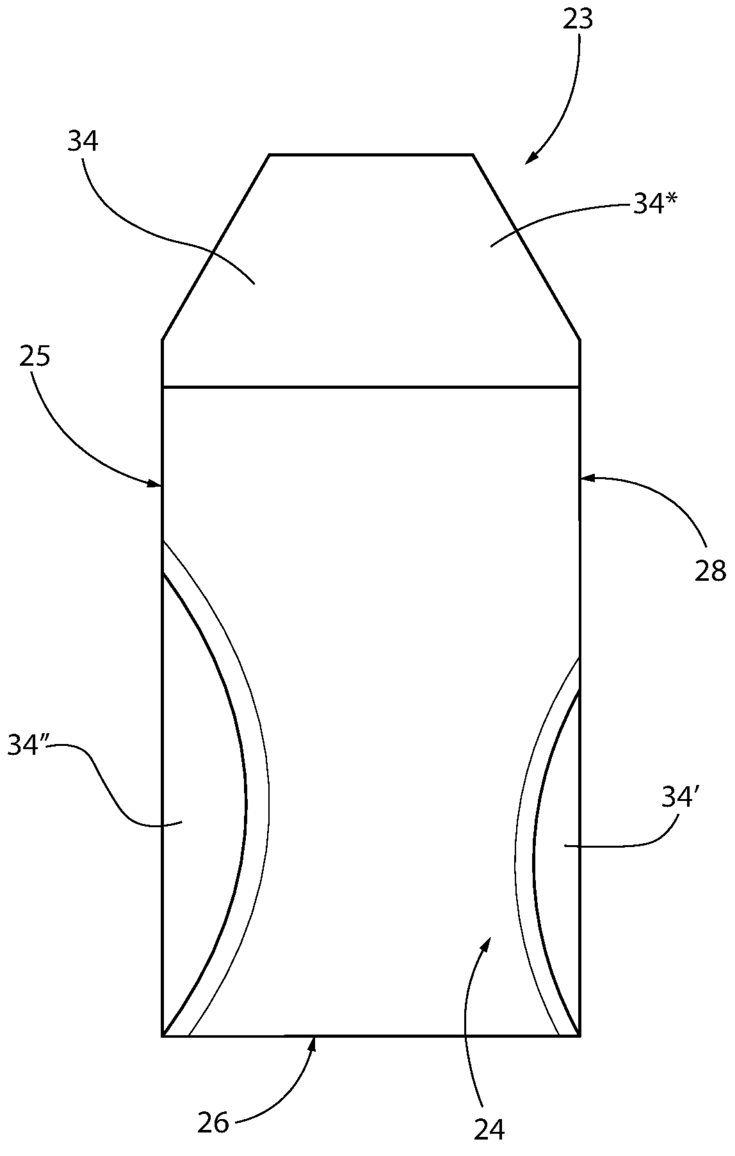
FIG. 14 is a front view of a different embodiment of the component of FIGS. 4 and 10.
Figure 16:
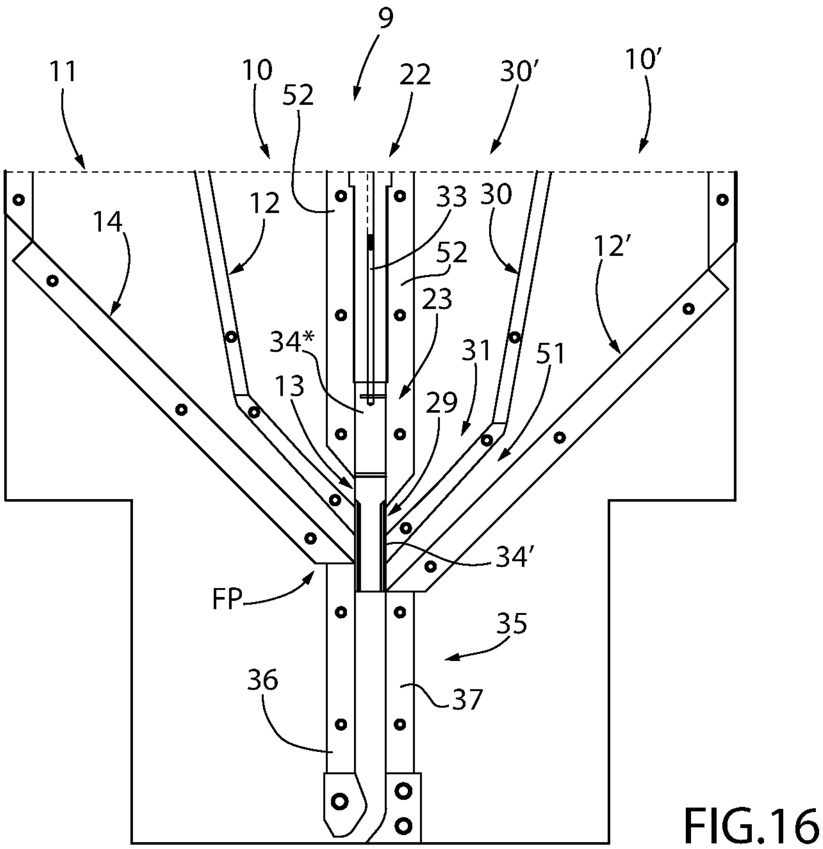
FIGS. 16, 17, 18 and 19 are side views of a different embodiment of the part of FIGS. 2 and 3 in different operating configurations.
Figure 17:
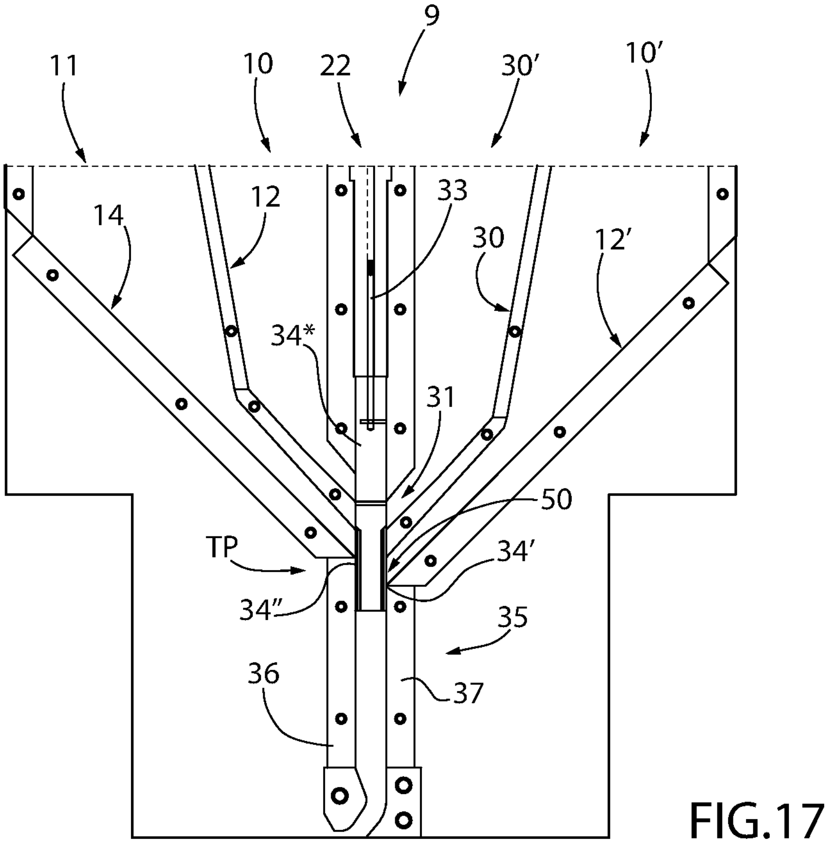
Figure 18:
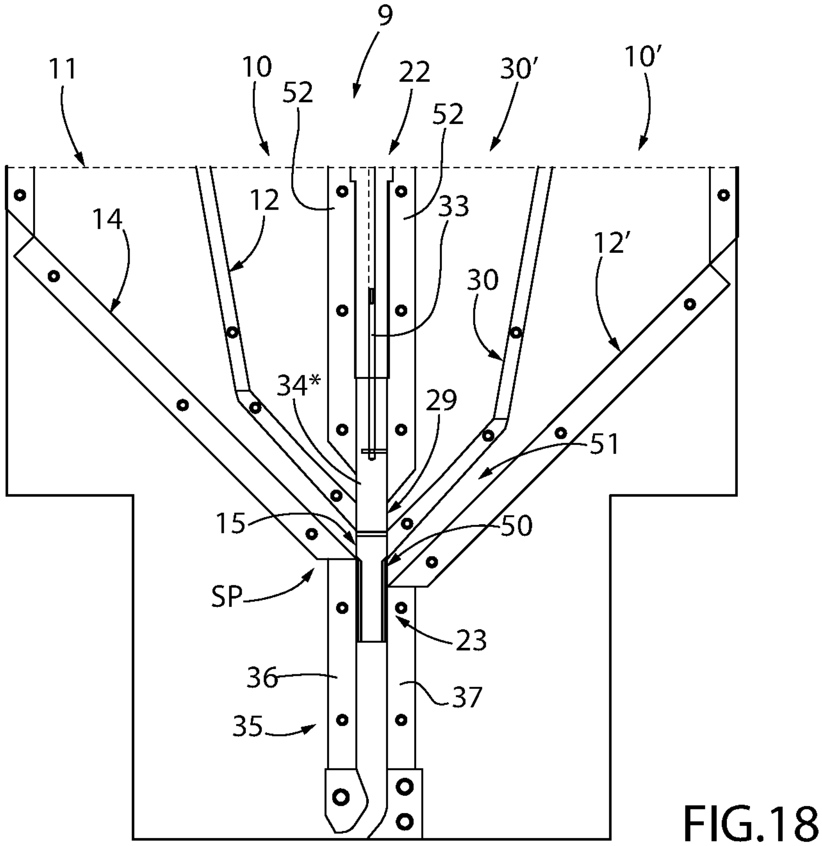
Figure 19:
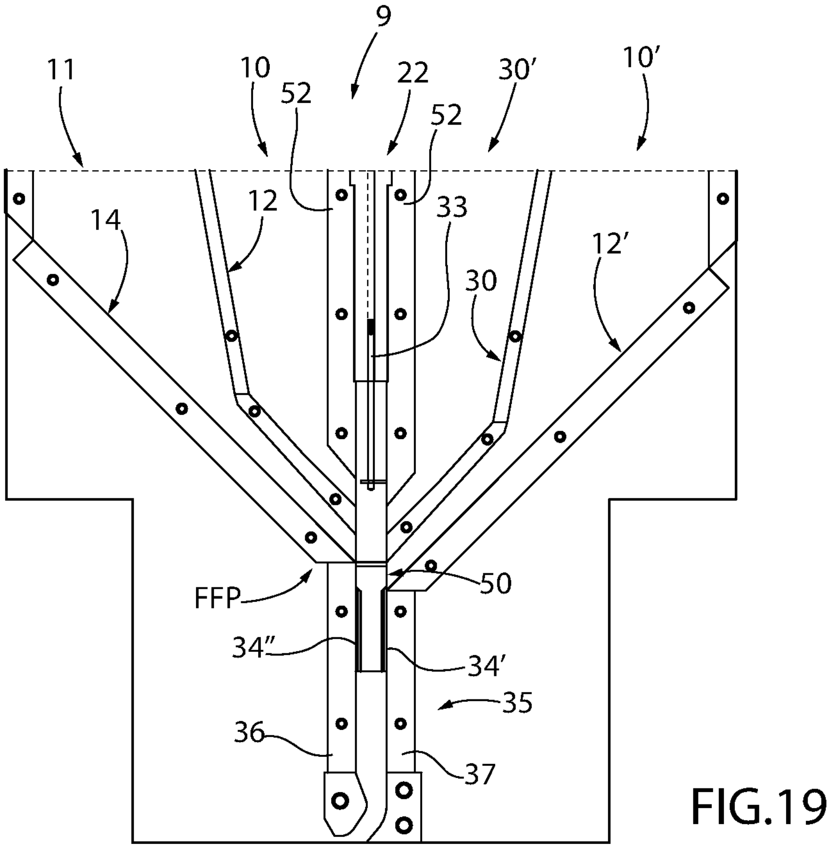

Advantageously but not necessarily, each moving part 23 is configured so as to at least partially make up for the different lengths covered by the different parts of powder material CP along the joining segment RT (FIGS. 12-14).

In particular, each transfer moving part 23 has a rear lateral wall 34' and a front lateral wall 34" arranged in succession (the lateral wall 34" downstream of the lateral wall 34') in the movement direction A and laterally limiting the respective transit channel 24. It should be noted that the lateral walls 34' and 34" are part of the raised portions 34.

According to some non-limiting embodiments, the moving part 23 also has an upper wall 34*, which delimits the respective transit channel 24 at the top. The upper wall 34* is part of the raised portion 34.

According to some non-limiting embodiments (FIG. 14), the lateral wall 34" has a convex curvature towards the inside of the channel 24 that is greater than the curvature towards the inside of the lateral wall 34'. In this way, the path of the particles of the powder material CP close to the lateral wall 34" and the above-mentioned deformation of the relative distribution of the powder materials CA and CB is at least partially made up for.

Alternatively or additionally (FIGS. 12 and 13), the inputs 25 and 28 are at a different height. In particular, the input 28 arranged upstream of the input 25 with respect to the direction A is at a greater height than the input 25. Also in this case, the above-mentioned deformation of the relative distribution of the powder materials CA and CB is at least partially made up for.

According to some non-limiting embodiments, the plant 1 comprises a printing device 38 (FIG. 1), which is adapted to create a graphic decoration over the layer of compacted ceramic powder KP transported by the conveyor assembly 5 and is arranged in the area of a printing station 39 (arranged upstream of the output station 7) along the given path (in particular, along the portion PB) downstream of the work station 4. The control unit 20 is adapted to control the printing device 38 so as to create a graphic decoration coordinated with said reference distribution 21, in particular so that a graphic decoration with a particular colour is (selectively) reproduced in the area of the powder material CA (or CB).

Advantageously but not necessarily, the plant 1 comprises a further application assembly 40 to at least partially cover the layer of compacted powder KP with a layer of a further powder material. In particular, the application assembly 40 is arranged along the given path (more precisely along the portion PA) upstream of the work station 4 (and upstream of the printing station 39).

In particular, the machine 1 further comprises a cutting assembly 41 to cut the layer of compacted ceramic powder KP crosswise so as to obtain slabs 42, each of which has a portion of the layer of compacted ceramic powder KP. More in particular, the cutting assembly 41 is arranged along the portion PB of the given path (between the work station 4 and the printing station 39). The slabs 42 comprise (consist of) compacted ceramic powder KP.

Advantageously but not necessarily, the cutting assembly 41 comprises at least one cutting blade 43, which is adapted to come into contact with the layer of compacted ceramic powder KP to cut it crosswise.

According to some non-limiting embodiments, the cutting assembly 41 further comprises at least two further blades 44, which are arranged on opposite sides of the portion PB and are adapted to cut the layer of compacted ceramic powder KP and define the lateral edges of the slabs 42 (and substantially parallel to the direction A)—optionally subdividing the slab into two or more longitudinal portions. In some specific cases, the cutting assembly 41 is the same as the one described in the patent application with publication number EP1415780.

In particular, the plant 1 comprises at least one firing kiln 45 to sinter the layer of compacted powder KP of the slabs 42 so as to obtain the ceramic articles T. More in particular, the firing kiln 45 is arranged along the given path (more precisely along the portion PB) downstream of the printing station 39 (and upstream of output station 7).

According to some non-limiting embodiments, the plant 1 further comprises a dryer 46, which is arranged along the portion PB downstream of the work station 4 and upstream of the printing station 39.

According to some non-limiting embodiments, the conveyor assembly 5 comprises a conveyor belt 47 extending (and adapted to move) from the input station 6 and through the work station 4, along the (more precisely, part of the) aforesaid given path.

In some cases, the feeding assembly 9 is adapted to move a layer of (not compacted) powder material CP to (onto) the conveyor belt 47 (in the area of the input station 6); the compacting device 3 is adapted to exert on the layer of ceramic powder CP a pressure transverse (in particular, normal) to the surface of the conveyor belt 47.

According to some non-limiting embodiments, a succession of transport rollers is provided downstream of the belt 47.

According to some embodiments, in particular, the compacting device 3 comprises at least two compression rollers 48 arranged on opposite sides of the conveyor belt 47 (one above and one below) to exert pressure on the powder material CP so as to compact the powder material CP itself (and obtain the layer of compacted powder).

Although only two rollers 48 are depicted in FIG. 1, in accordance with some variants, it is also possible to provide a plurality of rollers 48 arranged above and below the conveyor belt 4 as described, for example, in the patent EP641607B1, from which further details of the compacting device 3 can be deduced.

Advantageous (as in the embodiment depicted in FIG. 1) but not necessarily, the compacting device 3 comprises a pressure belt 49, which converges towards the conveyor belt 47 in the movement direction A. In this way, a pressure, which increases gradually in the direction A, is exerted (from top to bottom) on the powder material CP so as to compact it.

According to specific embodiments (as the one depicted in FIG. 1) the compacting device also comprises an opposing belt 49' arranged on the opposite side of the conveyor belt 47 with respect to the pressure belt 49 to cooperate with the conveyor belt 47 to provide a suitable response to the downward force exerted by the pressure belt 49. In particular, the pressure belt 49 and the opposing belt 49' are (mainly) made of metal (steel) so that they cannot be substantially deformed while pressure is exerted on the ceramic powder.

According to some embodiments, not depicted, the opposing belt 49' and the conveyor belt 47 are the same. In these cases, the belt 47 is (mainly) made of metal (steel) and the opposing belt 49' is absent.

Advantageously but not necessarily (with particular reference to FIGS. 16-19), the operating device 18 comprises a protection system for the operating units 22 (in particular, for the operating rods 33); in particular, the protection system being adapted to reduce the risk of (in particular, to prevent) the operating rods 33 (and the upper part of the moving parts 23; more precisely but not necessarily, the upper part 34*) from coming into contact with the powder material (e.g. CA and/or CB).

In this way, the operation of each operating unit 22 is improved, reducing the force required to move (above all upwards) the moving parts 23 and wear of the various parts.

More in particular, this protection system comprises two walls 52 arranged crosswise to the direction A (in particular, substantially perpendicularly), on opposite sides of the operating rods 33, in succession in the direction A. In other words, the walls 52 delimit a sliding channel (in particular, transverse to the direction A; more in particular, substantially vertical) for the operating rods 33 and (partially) for the moving part 23 (in particular, for the upper wall 34*).

Advantageously but not necessarily, the walls 52 and the upper wall 34* have a length such that at least part of the upper wall is inside the channel delimited by the walls 52 in any of the positions FP and SP (and optionally TP; and optionally FFP) of the moving part 23.

With the plant and method according to the present invention it is possible to obtain several advantages with respect to the state of the art. These include the following: reduced costs and complexity; the possibility of obtaining a reproducible and precise distribution even of more than two types or powders; a reproducible creation of veins of different materials (and therefore, for example, of different colours—even more than two) in the thickness of the articles; and the creation of veins obtained in the thickness of the articles (and therefore visible in the edges of the articles) in a position coordinated with respect to the surface decorations obtained by printing.

In particular, with respect to the patent application WO2018/163124, it should be noted that in accordance with the present invention it is also possible to reduce the number of actuators by half, thereby saving money, obtaining technical simplification (also in relation to management of the relative movement) and making miniaturisation possible (and therefore greater precision and definition in the manufacture of particular forms of distribution of the powder material CA in the powder material CB).

Unless expressly indicated to the contrary, the content of the references (articles, books, patent applications etc.) cited in this text is recalled in full herein. In particular, the above-mentioned references are incorporated herein by reference.

The invention claimed is:

1. A compacting machine for compacting a powder material comprising ceramic powder;

the compacting machine comprises a compacting device, which is arranged in the area of a work station and is configured to compact the powder material so as to obtain a layer of compacted powder; a conveyor assembly to transport the powder material along a first portion of a given path in a movement direction from an input station to the work station and the layer of compacted powder along a second portion of the given path from the work station to an output station; and a feeding assembly, which is configured to feed the powder material to the conveyor assembly in the area of the input station;

the feeding assembly comprises a first feeding device and at least one second feeding device, which are arranged above the conveyor assembly; the first feeding device comprises at least one respective first containing chamber, which is configured to contain a powder material of a first type and has at least one relative first output mouth, whose longitudinal extension is transverse to the movement direction; the second feeding device comprises at least one respective second containing chamber, which is configured to contain a powder material of a second type and has a relative second output mouth, whose longitudinal extension is transverse to the movement direction;

the first output mouth has respective first passage zones, which are arranged in succession along the longitudinal extension of the first output mouth; the second output mouth has respective second passage zones, which are arranged in succession along the longitudinal extension of the second output mouth; the feeding assembly further comprises an operating device, which is configured to allow the powder material to exit through the first and the second passage zones and/or to prevent it from doing so and comprises a plurality of operating units, each arranged in the area of a respective first passage zone and of a respective second passage zone and configured to regulate the passage of the powder material through the respective first and second passage zone;

wherein each operating unit comprises a respective transfer moving part, which has a transit channel provided with at least one input and at least one output arranged under the input, and a respective actuator to move the transfer moving part to a first position, in which the transit channel is connected to the first containing chamber so that the powder material of the first type moves from the first containing chamber to the transit channel, and at least to a second position, in which the transit channel is connected to the second containing chamber so that the powder material of the second type moves from the second containing chamber to the transit channel; the second position is arranged lower than the first position, and wherein each transfer moving part comprises a respective base wall, which partially delimits said transit channel and is transverse to a direction of the longitudinal extension of the first output mouth and of the second output mouth.

2. The compacting machine according to claim 1, wherein in the first position, the input faces the first output mouth, in the second position, the input faces the second output mouth.

3. The compacting machine according to claim 1, wherein each transit channel is provided with at least one further input; in the first position, the further input is connected to the first containing chamber so that the powder material of the first type moves from the first containing chamber to the transit channel.

4. The compacting machine according to claim 3, wherein said input and said further input are at least partially arranged on opposite sides of the respective transfer moving part.

5. The compacting machine according to claim 1, wherein the transfer moving parts are arranged in succession crosswise to the movement direction so that each transfer moving part is in contact with the adjacent transfer moving part/s.

6. The compacting machine according to claim 1, wherein each actuator is configured to move the respective transfer moving part to an intermediate position, which is between the first position and the second position and in which the respective transit channel is connected to the first containing chamber so that the powder material of the first type moves from the first containing chamber to the transit channel and is connected to the second containing chamber so that the powder material of the second type moves from the second containing chamber to the transit channel.

7. The compacting machine according to claim 1, wherein the feeding assembly comprises at least one third feeding device, which is arranged above the conveyor assembly; the third feeding device comprises a respective third containing chamber, which is configured to contain a powder material of a third type and has a relative third output mouth, whose longitudinal extension is transverse to the movement direction;

the third output mouth has respective third passage zones, which are arranged in succession along the longitudinal extension of the third output mouth;

the operating device is configured to allow the powder material of the third type to exit through the third passage zones and/or to prevent it from doing so;

each operating unit is arranged in the area of a respective third passage zone and is configured to regulate the passage of the powder material of the third type through the respective third passage zone;

each actuator is configured to move the transfer moving part at least to a third position, in which the transit channel is connected to the third containing chamber so that the powder material of the third type moves from the third containing chamber to the transit channel through the third output mouth.

8. The compacting machine according to claim 7, wherein, in the third position, the input faces the third output mouth.

9. The compacting machine according to claim 1, wherein said output faces downwards.

10. The compacting machine according to claim 1, wherein the transfer moving parts are arranged in succession crosswise to the movement direction so that each transfer moving part is in contact with the adjacent transfer moving part/s; each transfer moving part lacks a wall opposite the base wall; at least one of the transit channels is delimited, on the side opposite the respective base wall, by the base wall of the adjacent moving part.

11. The compacting machine according to claim 1, wherein each operating unit comprises a respective operating rod, which is integral to the respective transfer moving part and is connected to the respective actuator so as to transfer motion from the actuator to the transfer moving part.

12. The compacting machine according to claim 1 and comprising a control unit, which is configured to store a reference distribution of the powder material of the first and of the second type to be obtained in the powder material transported by the conveyor assembly and to control the operating device as a function of the reference distribution.

13. The compacting machine according to claim 12 and comprising a printing device, which is configured to create a graphic decoration over the layer of compacted ceramic powder transported by the conveyor assembly and is arranged in the area of a printing station along the given path downstream of the work station; the control unit being configured to control the printing device so as to create a graphic decoration coordinated with said reference distribution.

14. The compacting machine according to claim 1, wherein the feeding assembly comprises a transfer chamber, which is shaped so as to contain the powder material received from the first feeding device and from the second feeding device through said transit channels and to transfer the powder material to the conveyor assembly in the area of the input station; the transfer chamber is arranged between the first feeding device and the second feeding device on one side, and the conveyor assembly, on the other side.

15. The compacting machine according to claim 14, wherein the transfer chamber has a first wall and at least one second wall, which faces the first wall and is arranged upstream of the first wall relative to the movement direction;

the transfer chamber has a charging segment, which is crosswise to the movement direction and is arranged under the first containing chamber and the second containing chamber, a discharging segment, which is provided with a discharging opening at least partially oriented in the movement direction so as to transfer the powder material onto the conveyor assembly, and a joining segment, which is curved and is arranged between the charging segment and the discharging segment;

each transfer moving part being configured so as to at least partially make up for the different lengths covered by the different parts of powder material along the joining segment.

16. The compacting machine according to claim 1, wherein each operating unit comprises an actuator and a respective operating rod, which is integral to the respective moving part and is connected to the respective actuator so as to transfer motion from the actuator to the moving part; the operating device comprises a protection system for the operating units, said protection system is provided with two protective walls and is adapted to reduce the risk of the operating rods coming into contact with the powder material.

17. The compacting machine according to claim 1, wherein each actuator is configured to move the respective moving part in such a way that the respective transfer moving part slides in contact with the adjacent transfer moving part/s.

18. The compacting machine according to claim 11, wherein the operating rod extends from the transfer moving part upwards through the first containing chamber; wherein the actuator comprises a pneumatic operating member or an electric motor.

19. The compacting machine according to claim 12, wherein the compacting machine also comprises a detection device to detect the extent to which, in length, the conveyor assembly transports the powder material along the given path; the control unit is configured to control the operating device as a function of the data detected by the detection device and of the reference distribution.

20. A plant for manufacturing ceramic articles; the plant comprises a compacting machine according to claim 1;

a cutting assembly to cut the layer of compacted powder crosswise so as to obtain slabs, each of which has a portion of the layer of compacted powder; and at least one firing kiln for sintering the layer of compacted powder of the slabs so as to obtain the ceramic articles.

21. A compacting machine for compacting a powder material comprising ceramic powder;

the compacting machine comprises a compacting device, which is arranged in the area of a work station and is configured to compact the powder material so as to obtain a layer of compacted powder; a conveyor assembly to transport the powder material along a first portion of a given path in a movement direction from an input station to the work station and the layer of compacted powder along a second portion of the given path from the work station to an output station; and a feeding assembly, which is configured to feed the powder material to the conveyor assembly in the area of the input station;

the feeding assembly comprises a first feeding device and at least one second feeding device, which are arranged above the conveyor assembly; the first feeding device comprises at least one respective first containing chamber, which is configured to contain a powder material of a first type and has at least one relative first output mouth, whose longitudinal extension is transverse to the movement direction; the second feeding device comprises at least one respective second containing chamber, which is configured to contain a powder material of a second type and has a relative second output mouth, whose longitudinal extension is transverse to the movement direction;

the first output mouth has respective first passage zones, which are arranged in succession along the longitudinal extension of the first output mouth; the second output mouth has respective second passage zones, which are arranged in succession along the longitudinal extension of the second output mouth; the feeding assembly further comprises an operating device, which is configured to allow the powder material to exit through the first and the second passage zones and/or to prevent it from doing so and comprises a plurality of operating units, each arranged in the area of a respective first passage zone and of a respective second passage zone and configured to regulate the passage of the powder material through the respective first and second passage zone;

wherein each operating unit comprises a respective transfer moving part, which has a transit channel provided with at least one input and at least one output arranged under the input, and a respective actuator to move the transfer moving part to a first position, in which the transit channel is connected to the first containing chamber so that the powder material of the first type moves from the first containing chamber to the transit channel, and at least to a second position, in which the transit channel is connected to the second containing chamber so that the powder material of the second type moves from the second containing chamber to the transit channel; the second position is arranged lower than the first position, and wherein the feeding assembly comprises a transfer chamber, which is shaped so as to contain the powder material received from the first feeding device and from the second feeding device through said transit channels and to transfer the powder material to the conveyor assembly in the area of the input station; the transfer chamber is arranged between the first feeding device and the second feeding device on one side, and the conveyor assembly, on the other side.

22. A compacting machine for compacting a powder material comprising ceramic powder;

the compacting machine comprises a compacting device, which is arranged in the area of a work station and is configured to compact the powder material so as to obtain a layer of compacted powder; a conveyor assembly to transport the powder material along a first portion of a given path in a movement direction from an input station to the work station and the layer of compacted powder along a second portion of the given path from the work station to an output station; and a feeding assembly, which is configured to feed the powder material to the conveyor assembly in the area of the input station;

the feeding assembly comprises a first feeding device and at least one second feeding device, which are arranged above the conveyor assembly; the first feeding device comprises at least one respective first containing chamber, which is configured to contain a powder material of a first type and has at least one relative first output mouth, whose longitudinal extension is transverse to the movement direction; the second feeding device comprises at least one respective second containing chamber, which is configured to contain a powder material of a second type and has a relative second output mouth, whose longitudinal extension is transverse to the movement direction;

the first output mouth has respective first passage zones, which are arranged in succession along the longitudinal extension of the first output mouth; the second output mouth has respective second passage zones, which are arranged in succession along the longitudinal extension of the second output mouth; the feeding assembly further comprises an operating device, which is configured to allow the powder material to exit through the first and the second passage zones and/or to prevent it from doing so and comprises a plurality of operating units, each arranged in the area of a respective first passage zone and of a respective second passage zone and configured to regulate the passage of the powder material through the respective first and second passage zone;

wherein each operating unit comprises a respective transfer moving part, which has a transit channel provided with at least one input and at least one output arranged under the input, and a respective actuator to move the transfer moving part to a first position, in which the transit channel is connected to the first containing chamber so that the powder material of the first type moves from the first containing chamber to the transit channel, and at least to a second position, in which the transit channel is connected to the second containing chamber so that the powder material of the second type moves from the second containing chamber to the transit channel; the second position is arranged lower than the first position, and wherein the transfer moving parts are arranged in succession crosswise to the movement direction so that each transfer moving part is in contact with the adjacent transfer moving part/s.

* * * * *